US011876981B2

(12) United States Patent
Hanhart et al.

(10) Patent No.: US 11,876,981 B2
(45) Date of Patent: Jan. 16, 2024

(54) METHOD AND SYSTEM FOR SIGNALING OF 360-DEGREE VIDEO INFORMATION

(71) Applicant: VID SCALE, INC., Wilmington, DE (US)

(72) Inventors: Philippe Hanhart, La Conversion (CH); Yuwen He, San Diego, CA (US); Yan Ye, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 32 days.

(21) Appl. No.: 17/671,494

(22) Filed: Feb. 14, 2022

(65) Prior Publication Data

US 2022/0174289 A1 Jun. 2, 2022

Related U.S. Application Data

(63) Continuation of application No. 16/329,674, filed as application No. PCT/US2017/049495 on Aug. 30, 2017, now Pat. No. 11,284,089.

(Continued)

(51) Int. Cl.
*H04N 19/167* (2014.01)
*H04N 19/85* (2014.01)
(Continued)

(52) U.S. Cl.
CPC ......... *H04N 19/167* (2014.11); *H04N 19/184* (2014.11); *H04N 19/597* (2014.11); *H04N 19/85* (2014.11)

(58) Field of Classification Search
CPC .............................. H04N 19/167; H04N 19/85
(Continued)

(56) References Cited

U.S. PATENT DOCUMENTS 9,420,310 B2 8/2016 Tian
2015/0124049 A1 5/2015 Kimura
(Continued)

FOREIGN PATENT DOCUMENTS

CN 105681805 A 6/2016
CN 105812759 A 7/2016
(Continued)

OTHER PUBLICATIONS

Xin Wang: "Adaptive Streaming of Omnidirectional Video in DASH", 115. MPEG Meeting; May 30, 2016-Jun. 3, 2016; Geneva; (Motion Picture Expert Group or ISO/IEC JTC1/SC29/WG11), No. m38670, May 31, 2016 (May 31, 2016), XP030067022, the whole document.

(Continued)

*Primary Examiner* — Amir Shahnami
(74) *Attorney, Agent, or Firm* — Klintworth & Rozenblat IP LLP

(57) ABSTRACT

Coding techniques for 360-degree video are described. An encoder selects a projection format and maps the 360-degree video to a 2D planar video using the selected projection format. The encoder encodes the 2D planar video in a bitstream and further signals, in the bitstream, parameters identifying the projection format. The parameters identifying the projection format may be signaled in a video parameter set, sequence parameter set, and/or picture parameter set of the bitstream. Different projection formats that may be signaled include formats using geometries such as equirectangular, cubemap, equal-area, octahedron, icosahedron, cylinder, and user-specified polygon. Other parameters that may be signaled include different arrangements of geometric faces or different encoding quality for different faces. Corresponding decoders are also described. In some embodiments, projection parameters may further include (Continued)

relative geometry rotation parameters that define an orientation of the projection geometry.

20 Claims, 18 Drawing Sheets

Related U.S. Application Data

(60) Provisional application No. 62/407,337, filed on Oct. 12, 2016, provisional application No. 62/383,367, filed on Sep. 2, 2016.

(51) Int. Cl.
*H04N 19/184* (2014.01)
*H04N 19/597* (2014.01)

(58) Field of Classification Search
USPC .................................................. 375/240.02
See application file for complete search history.

(56) References Cited

U.S. PATENT DOCUMENTS

| | | | |
|---|---|---|---|
| 2016/0012855 | A1 | 1/2016 | Krishnan |
| 2016/0065983 | A1 | 3/2016 | Choi |
| 2016/0142697 | A1 | 5/2016 | Budagavi |
| 2017/0099501 | A1* | 4/2017 | Araki ............... H04N 19/82 |
| 2017/0323423 | A1 | 11/2017 | Lin |
| 2017/0336705 | A1 | 11/2017 | Zhou |
| 2018/0054613 | A1* | 2/2018 | Lin .................. H04N 19/117 |
| 2019/0082184 | A1 | 3/2019 | Hannuksela |

FOREIGN PATENT DOCUMENTS

| | | | |
|---|---|---|---|
| EP | 3482563 | A0 | 5/2019 |
| JP | 2006309802 | A | 11/2006 |
| WO | 2016064862 | A1 | 4/2016 |
| WO | 2017188714 | A1 | 11/2017 |
| WO | 2017190710 | A1 | 11/2017 |
| WO | 2017205648 | A1 | 11/2017 |
| WO | 2018001194 | A1 | 1/2018 |
| WO | 2018009746 | A1 | 1/2018 |

OTHER PUBLICATIONS

Hannuksela MM et al: "DASH / OMAF: Virtual reality video descriptor", 115. MPEG Meeting; May 30, 2016-Jun. 3, 2016; Geneva; (Motion Picture Expert Group or ISO/IEC JTC1/SC29/WG11), No. m38613, May 25, 2016 (May 25, 2016), XP030066965, the whole document.

"Technologies under Considerations for Omnidirectional Media Application Format", 114. MPEG MEETING;Feb. 22, 2016-Feb. 26, 2016; San Diego; (Motion Picture Expert Group or ISO/IEC JTC1/SC29/WG11), No. N15946, Mar. 3, 2016 (Mar. 3, 2016), XP030022620, the whole document.

Sejin Oh et al: "Support of 360-Degree Video (VR Video) Streaming over DASH", 115. MPEG Meeting; May 30, 2016-Jun. 3, 2016; Geneva; (Motion Picture Expert Group or ISO/IEC JTC1/SC29/WG11), No. m38566, May 25, 2016 (May 25, 2016), XP030066922, the whole document.

Hanhart P et al: "AHG8: High level syntax extensions for signaling of 360-degree video information", 4. JVET Meeting; Oct. 15, 2016-Oct. 21, 2016; Chengdu; (JVET of ISO/IEC JTC1/SC29/WG11 and ITU-T SG.16); URL: http://phenix.int-evry.fr/jvet/, No. JVET-D0093, Oct. 6, 2016 (Oct. 6, 2016), XP030150330, the whole document.

Fogg (Movielabs) C: "Essential metadata to support virtual reality in AVC and HEVC elementary video streams", 25. JCT-VC Meeting; Oct. 14, 2016-Oct. 21, 2016; Chengdu; (JCTVC of ISO/IEC JTC1/SC29/WG11 and ITU-T SG.16); URL: http://wftp3.itu.int/av-arch/jctvc-site/, No. JCTVC-Y0023-v4, Oct. 21, 2016 (Oct. 21, 2016), XP030118062, the whole document.

He Y et al: "AHG8: InterDigital's projection formal conversion tool", 4. JVET Meeting; Oct. 15, 2016-Oct. 21, 2016; Chengdu; (The Joint Video Exploration Teaam of ISO/IEC JTC1/SC29/WG11 and ITU-T SG.16) URL; http://phenix.int-evry.fr/jvet/, No. JVET-D0021, Aug. 12, 2016 (Aug. 12, 2016), XP030150243, Sections 1-3.

Yu Matt et al: "A Framework to Evaluate Omnidirectional Video Coding Schemes", 2015 IEEE International Symposium On Mixed and Augmented Reality, IEEE, Sep. 29, 2015 (Sep. 29, 2015), pp. 31-36, XP032809476, DOI: 1.1109/ISMAR.2015.12 [retrieved on Nov. 11, 2015] the whole document.

International Search Report and Written Opinion of the International Searching Authority for PCT/US2017/049495 dated Nov. 13, 2017.

Written Opinion of the International Examining Authority for PCT/US2017/049495 dated Aug. 8, 2018.

Sejin Oh et al., "Signaling of VR Video Information in ISO BM FF", 115. MPEG Meeting; May 30, 2016-Jun. 3, 2016;Geneva;(Motion Picture Expert Group or ISO/IEC JTC1/SC29/WG11), No. m38565, May 25, 2016 (May 25, 2016), XP030066921.

International Preliminary report on Patentability for PCT/US2017/049495 completed on Nov. 26, 2018.

Norkin, A., et al., "Call for Test Material for Future Video Coding Standardization". JVET-B1002, Feb. 2016, 4 pages.

Abbas, A., "GoPro Test Sequences for Virtual Reality Video Coding". JVET C0021, May 2016, 10 pages.

Sullivan, G., et al., "Meeting Notes of the 3rd Meeting of The Joint Video Exploration Team (JVET)". JVET-C1000, Jun. 2016, 73 pages.

Choi, K., et al., "Test sequence formats for virtual reality video coding". JVET-C0050, Jun. 2016, 6 pages.

Ridge, J., et al., "Nokia Test Sequences for Virtual Reality Video Coding", JVET-C0064, Jun. 2016, 2 pages.

Thomas, Emmanuel, et., al., "5G and Future Media Consumption". International Organization for Standardization, Coding of Moving Pictures and Audio, ISO/IEC JTC1/SC29/WG11, MPEG2016, M37604, Feb. 2016, 10 pages.

International Organization for Standardization, "Requirements for OMAF". International Organization for Standardization, Coding of Moving Pictures and Audio, ISO/IEC JTC1/SC29/WG11, N16143, Feb. 2016, 2 pages.

Choi, Byeongdoo, "Technologies Under Consideration for Omnidirectional Media Application Format". International Organization for Standardization, Coding of Moving Pictures and Audio, ISO/IEC JTC1/SC29/WG11, N15946, Feb. 2016, 16 pages.

Bang. Gun, et al., "Description Of 360 3D Video Application Exploration Experiments on Divergent Multi-View Video". International Organization for Standardization, Coding of Moving Pictures and Audio, ISO/IEC JTC1/SC29/WG11, MPEG2015, M16129, Feb. 2016, 5 pages.

Facebook, "Facebook 360". Web Archive dated, Sep. 1, 2016, available at: https://web.archive.org/web/20160901081817/https://facebook360.fb.com/, 2 pages.

Kuzyakov, E., et al., "Next-Generation Video Encoding Techniques For 360 Video and VR". Retrieved from https://code.fb.com/virtual-reality/next-generation-video-encoding-techniques-for-360-video-and-vr/, Jan. 21, 2016, 9 pages.

Budagavi, Madhukar, et al., "360 Degrees Video Coding Using Region Adaptive Smoothing". IEEE International Conference on Image Processing, (2015), pp. 750-754.

Mack Rides Coasters, "VR Coaster—Welcome to the Pioneers of the Augmented Thrill Ride". Web Archive dated Aug. 27, 2016, available at: https://web.archive.org/web/20160827165827/http://www.vrcoaster.com/, 5 pages.

Yu, Matt, et al. "A Framework to Evaluate Omnidirectional Video Coding Schemes". IEEE International Symposium on Mixed and Augmented Reality, (2015), pp. 31-36.

Yu, M., et al., "Content Adaptive Representations of Omnidirectional Videos for Cinematic Virtual Reality". ImmersiveME '15

(56) References Cited

OTHER PUBLICATIONS

Proceedings of the 3rd International Workshop on Immersive Media Experiences, Oct. 30, 2015, 6 pages.

* cited by examiner

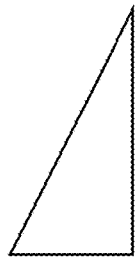
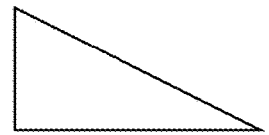
FIG. 10A  FIG. 10B  FIG. 10C  FIG. 10D
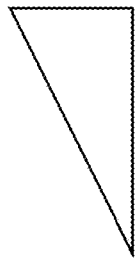
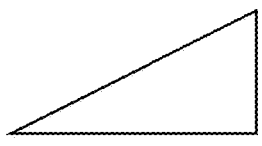
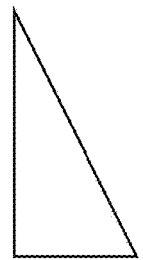
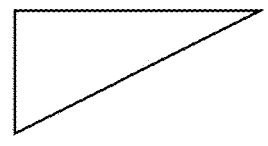
FIG. 10E  FIG. 10F  FIG. 10G  FIG. 10H
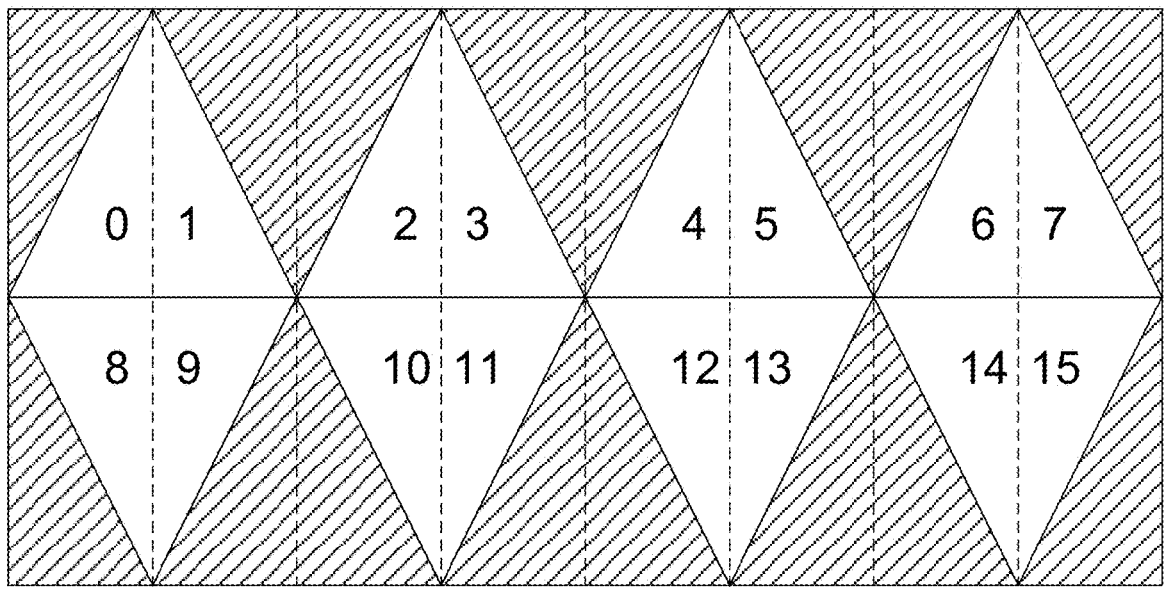
FIG. 11A

METHOD AND SYSTEM FOR SIGNALING OF 360-DEGREE VIDEO INFORMATION

CROSS-REFERENCE TO RELATED APPLICATIONS

The present application is a continuation of U.S. patent application Ser. No. 16/329,674, filed Feb. 28, 2019, which is a national stage application under 35 U.S.C. 371 of International Application No. PCT/US2017/049495, entitled METHOD AND SYSTEM FOR SIGNALING OF 360-DEGREE VIDEO INFORMATION, filed on Aug. 30, 2017, which claims benefit under 35 U.S.C. § 119(e) from U.S. Provisional Patent Application Ser. No. 62/383,367 entitled "Method and System for Signaling of 360-Degree Video Information," filed Sep. 2, 2016, and U.S. Provisional Patent Application Ser. No. 62/407,337 entitled "Method and System for Signaling of 360-Degree Video Information," filed Oct. 12, 2016, all of which are hereby incorporated by reference in their entirety.

BACKGROUND

Virtual reality (VR) is coming out of research labs and into our daily lives. VR has many areas of application: healthcare, education, social networking, industry design/training, games, movies, shopping, entertainment, and more. It is gaining significant attention from industries and consumers because VR is capable of bringing an immersive viewing experience. It creates a virtual environment surrounding the viewer and may generate a true sense of "being there." How to provide the full real feeling in the VR environment is important for a user's experience. For example, a VR system should support interactions through posture, gesture, eye gaze, voice, and/or the like. To allow the user to interact with objects in the VR world in a natural way, the system also may also provide haptic feedback to the user.

Today's VR systems use 360-degree video to provide users the ability to view a scene from 360-degree angles in the horizontal direction and 180-degree angles in the vertical direction. At the same time, VR and 360-degree video are being considered the future direction for media consumption beyond Ultra High Definition (UHD) service. In order to improve the quality of 360-degree video in VR and standardize the processing chain for interoperability of VR clients, an ad hoc group, belonging to MPEG-A (multimedia application format) Part-19, was set up in ISO/IEC/MPEG to work on the requirements and potential technologies for omnidirectional media application format in early 2016. Another ad hoc group, free view TV (FTV), issued the exploration experiments for 360-degree 3D video application. One major goal for FTV is to test the performance of two solutions: (1) 360-degree video (omnidirectional video) based systems; (2) multi-view based systems. The joint video exploration team (JVET) from MPEG and ITU-T, which is exploring the new technologies for next generation video coding standard, issued a call for test sequences including VR. In the June meeting 2016, ad hoc group (AHG8) was established and the mandates of the AHG8 group are to work out the common test conditions, test sequence formats and evaluation criteria for 360 video coding. AHG8 will also study the effect on compression when different projection methods are applied, as well as the conversion software.

The industry is working on improving the quality and user experience of various aspects in the VR processing chain, including capturing, processing, display, and applications. On the capturing side, a VR system uses multiple cameras system to capture the scene from different divergent views (e.g., in some cases approximately 6 to 12 views). Those views are stitched together to form a 360-degree video in high resolution (e.g., 4K or 8K). On the client or user side, current virtual reality systems usually include a computation platform, a head mounted display (HMD), and head tracking sensors. The computation platform is in charge of receiving and decoding 360-degree video, and generating the viewport for display. Two pictures, one for each eye, are rendered for the viewport. The two pictures are displayed in the HMD for stereo viewing. A lens may be used to magnify the images displayed in the HMD for better viewing. Head tracking sensors may constantly keep track of the viewer's head orientation, and feed the orientation information to the system to display the viewport picture for that orientation.

Some VR systems may provide a specialized touch device for the viewer to interact with objects in the virtual world. There are existing VR systems available in the market. One is the Rift provided by Oculus, and also Gear VR which is a product from Samsung and Oculus. The Rift is driven by a powerful workstation with good GPU support. Gear VR is a light VR system, which uses a smartphone as the computation platform, HMD display, and head tracking sensor. A second VR system is the HTC Vive system. Rift and Vive have similar performance. The spatial HMD resolution is 2160×1200, refresh rate is 90 Hz, and the field of view (FOV) is about 110 degrees. The sampling rate for the head tracking sensor is 1000 Hz, which can capture very fast movement. Google also has a simple VR system called cardboard. Google cardboard has a lens and cardboard assembly, and similar to Gear VR, it is driven by a smartphone. Sony also provides PlayStation VR for gaming. In terms of 360-degree video streaming services, YouTube and Facebook are among the early providers.

The quality of experience such as interactivity and haptics feedback are still in need of further improvements in these current VR systems. For example, today's HMDs are still too large and are not convenient to wear. Also, the current resolution of 2160×1200 for stereoscopic views provided by HMDs is not sufficient, and may cause dizziness and discomfort for some users. Hence, resolution increase would be beneficial. Further, to combine the feeling from vision in a VR environment with force feedback in the real world is one option to enhance the VR experience. VR roller coaster is an example application.

Many companies are working on 360-degree video compression and delivery systems, and they have their own solutions. For example, Google YouTube provided a channel for DASH based 360-degree video streaming. Facebook also has solutions for 360-degree video delivery.

The systems and methods herein seek to address issues related to 360-degree video data encoding and decoding.

SUMMARY

In an exemplary method of encoding 360-degree video, an encoder selects a projection format, wherein the projection format includes information such as a geometry type and/or geometry orientation. The encoder maps the 360-degree video to a 2D planar video using the selected projection format. The encoder encodes the 2D planar video in a bitstream and further signals, in the bitstream, parameters identifying the projection format. Various geometry types may be used and may be signaled in the bitstream, including equirectangular, cubemap, equal-area, octahedron, icosahedron, cylinder, and user-specified polygon. For geometries types that are associated with a plurality of faces, frame-packing parameters may be signaled to identify the positions and/or orientations of those faces in the 2D planar video. Different faces may be encoded with different sizes and/or different levels of quality. Parameters identifying the geometry orientation may include at least one of a yaw parameter, a pitch parameter, and a roll parameter.

The parameters identifying the projection format may be signaled in a video parameter set, sequence parameter set, and/or picture parameter set of the bitstream. The projection parameters may be selected based on rate-distortion optimization. Different pictures or different sequences in the video may be encoded using different projection formats (e.g. when different pictures or sequences have higher rate-distortion performance with different projection formats), with signaling of the projection format parameters being provided at the appropriate parameter set(s). Corresponding decoding techniques are also described.

Described in the present disclosure are exemplary syntaxes for use with 360-degree video coding. Syntax elements may be used to specify a projection geometry and/or to specify an arrangement of faces in a frame-packed picture using a grid system. Faces can have different size and/or orientation. In some embodiments, face arrangement on a 2-D plane may have various characteristics, such as constant face width/height along each column/row. In some embodiments, exemplary syntax is described for user specified geometry using any polygon-based representation. Additional features employed in some embodiments may include use of a flag to skip samples used for padding a frame-packed picture, signaling of delta quantization parameters (QP) on a face-by-face level, a flag to enable/disable loop filters across particular faces, and/or syntax to code only a particular region of 360-video.

In some embodiments, projection parameters may further include relative geometry rotation parameters. Such parameters may define an orientation of the projection geometry. The projection geometry may be selectively oriented such that an object of interest is substantially entirely included within a single face of the projection geometry. In embodiments in which different faces are encoded with different levels of quality (e.g. different QP values), the projection geometry may be oriented such that an object of interest is substantially entirely included within a face encoded with a relatively high quality level.

BRIEF DESCRIPTION OF THE DRAWINGS

A more detailed understanding may be had from the following description, presented by way of example in conjunction with the accompanying drawings, wherein:

FIGS. 10A-10H illustrate the definitions of face rotation for triangular faces: FIG. 10A: 0° rotation; FIG. 10B: 90° rotation; FIG. 10C: 180° rotation; FIG. 10D: 270° rotation; FIG. 10E: 0° rotation followed by vertical flip; FIG. 10F: 90° rotation followed by vertical flip; FIG. 10G: 180° rotation followed by vertical flip; FIG. 10H: 270° rotation followed by vertical flip.

FIG. 11A illustrates a non-compact frame packing format for an octahedron.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

360-Degree Video Encoding and Decoding.

Figure 1A:
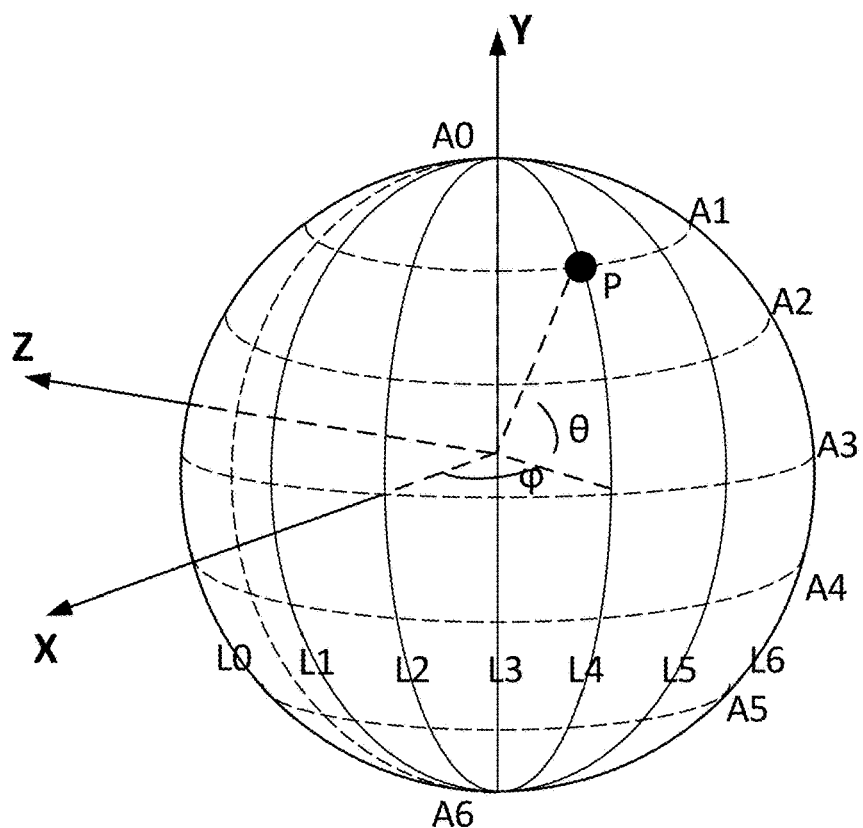
FIG. 1A illustrates an equirectangular projection on a sphere geometry, with sphere sampling in longitude and latitude.
Figure 1C:
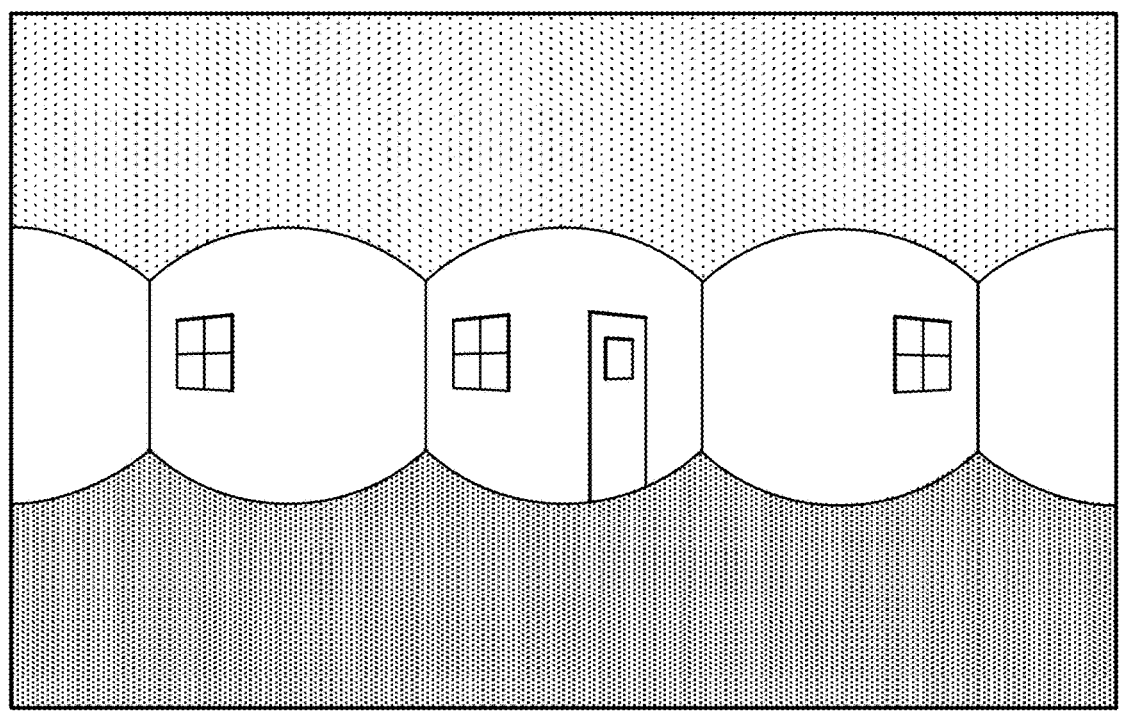
FIG. 1C is a schematic illustration of an example picture with equirectangular projection.
Figure 1B:
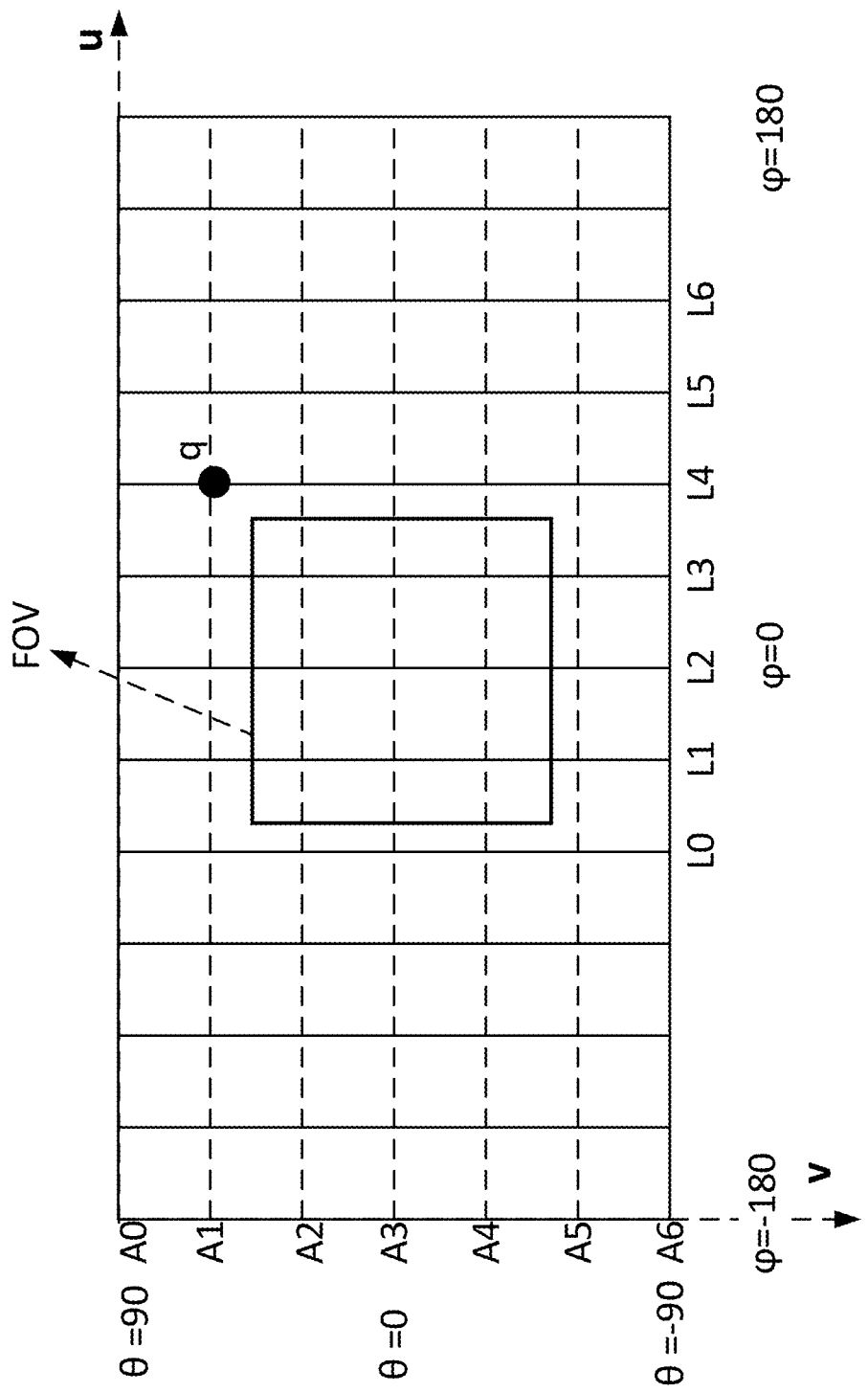
FIG. 1B illustrates the 2D planar equirectangular projection for the sampling in FIG. 1A, where the point P on the sphere in FIG. 1A is projected to point q in the 2D plane.

One technique of 360-degree video delivery is to represent the 360-degree information using sphere geometry structure. For example, the synchronized multiple views captured by the multiple cameras are stitched on the sphere as one integral structure. Then the sphere information is projected to 2D planar surface with a given geometry conversion process, for example, the equirectangular projection (ERP) method. FIG. 1A shows the sphere sampling in longitudes (ϕ) and latitudes (θ), and FIG. 1B shows the sphere being projected to a 2D plane using equirectangular projection. The longitude ϕ in the range [−π, π] is known as yaw, and latitude θ in the range [−π/2, π/2] is known as pitch in aviation, where 7C is the ratio of a circle's circumference to its diameter. For ease of explanation, (x, y, z) are used to represent a point's coordinates in 3D space, and (ue, ve) are used to represent a point's coordinates in a 2D plane with equirectangular projection. Equirectangular projection can be represented mathematically in Equations (1) and (2):

$$ue = (\phi(2*\pi) + 0.5)*W \qquad (1)$$

$$ve = (0.5 - \theta/\pi)*H \qquad (2)$$

where W and H are the width and height of the 2D planar picture. As shown in FIG. 1A, the point P, the cross point between longitude L4 and latitude A1 on the sphere, is mapped to a unique point q in the 2D plane (FIG. 1B) using the Equations (1) and (2). The point q in the 2D plane can be projected back to the point P on the sphere via inverse projection. The field of view (FOV) in FIG. 1B shows an example that the FOV in sphere is mapped to 2D plane with the view angle along X axis being about 110 degrees.

With ERP, 360-degree video can be mapped to a normal 2D video. It can be encoded with an existing video codec such as H.264 or HEVC, then be delivered to the client. At the client side, the equirectangular video is decoded, then rendered based on the user's viewport by projecting and displaying the portion belonging to the FOV in the equirectangular picture within the HMD. Though spherical video can be transformed to 2D planar picture for encoding with equirectangular projection, the characteristics of an equirectangular 2D picture are different from those of a conventional 2D picture (also called rectilinear video). FIG. 1C is a schematic representation of an example equirectangular picture of an interior of a room. The top portion of the picture corresponding to a North Pole and the bottom portion corresponding to a South Pole are stretched compared to the middle portion of the picture corresponding to an Equator as a result of the equirectangular sampling in the 2D spatial domain being uneven. The motion field in the 2D equirectangular picture among the temporal direction becomes complicated compared to the motion in the normal 2D video.

Video codecs such as MPEG-2, H.264, and HEVC use translational models to describe motion fields and cannot efficiently represent the shape-varying movement in equirectangular-projected 2D planar pictures. Another drawback of equirectangular projection is that, compared to the areas closer to the Equator, areas closer to the poles may be less interesting for viewers and/or content providers. For example, the viewer may not focus on the top and bottom regions for any substantial duration. However, based on the warping effect, these areas are stretched to become a large portion of the 2D plane after equirectangular projection, and compressing these regions may consequently require a substantial number of bits.

Figure 2A:
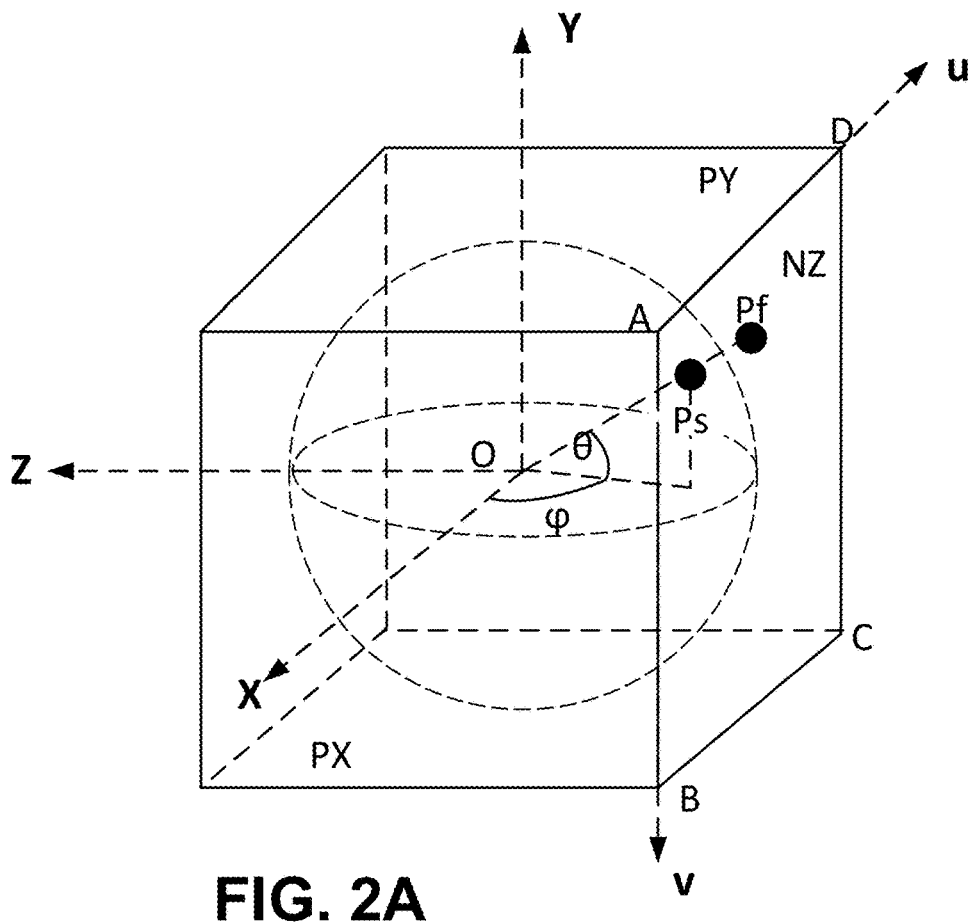
FIG. 2A illustrates cubemap projection on a 3D geometry structure, with faces PX (0), NX (1), PY (2), NY (3), PZ (4), NZ (5).
Figure 2B:
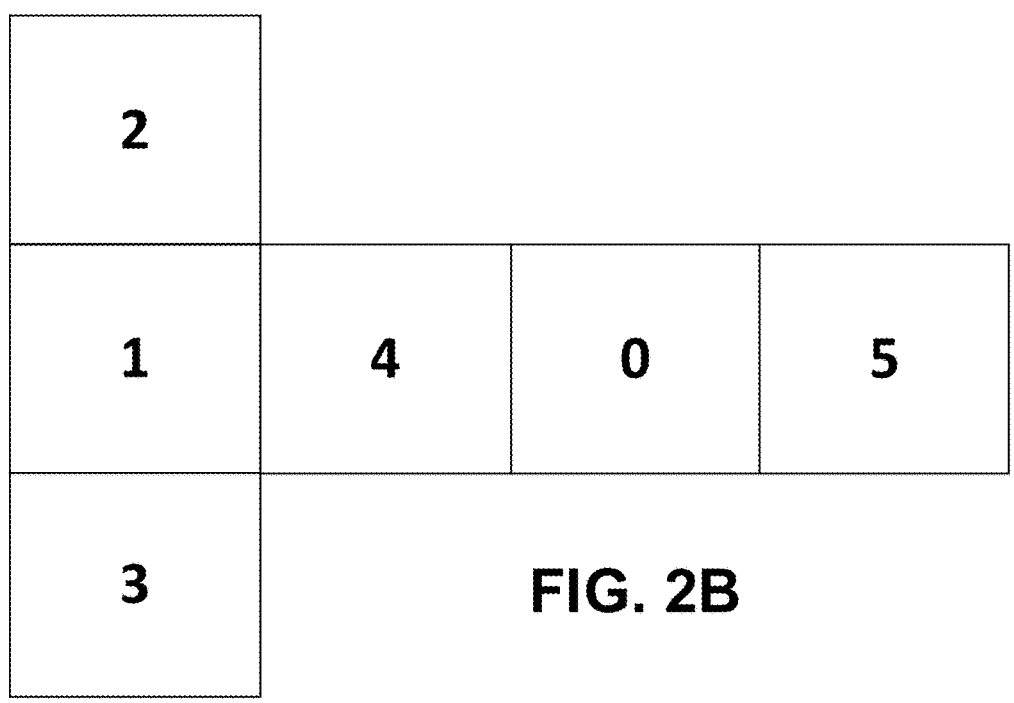
FIG. 2B illustrates the 2D plane for the six faces defined in FIG. 2A.
Figure 2C:
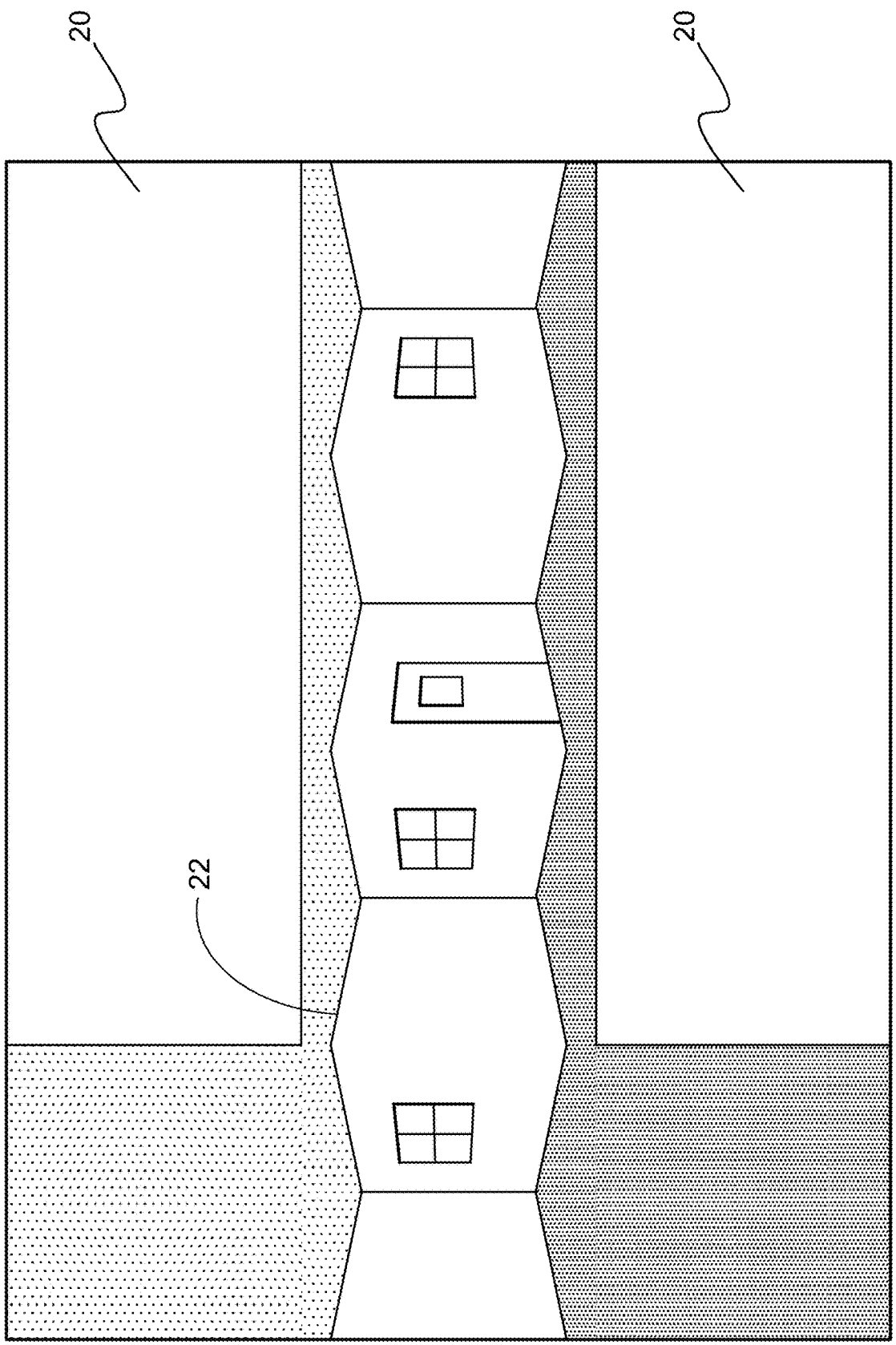
FIG. 2C schematically illustrates an example picture with cubemap projection.

Based on these observations, some processing methods are being investigated to improve equirectangular picture coding, for example, by applying pre-processing such as smoothing to these pole areas to reduce the bandwidth required to code them. Also, different geometric projections to represent 360-degree video have been proposed, such as cubemap, equal-area, cylinder, pyramid, octahedron, etc. Among these projection methods, the most compression-friendly geometry may be the cubemap, which has 6 faces in total, each face a planar square. FIG. 2A shows an example of the cubemap geometry. The cubemap consists of 6 square faces. Suppose the radius of the tangent sphere is 1, then the lateral length of each face (square) of cubemap is 2. FIG. 2B shows one packing method to place 6 faces into a rectangular, which can be used for encoding and delivery. A schematic illustration of an example picture with cubemap projection is shown in FIG. 2C. The blank regions (20) are padded regions to fill in the rectangular picture. For each face, the picture looks the same as normal 2D picture. However, the boundary of each face is not continuous. A straight line crossing two neighboring faces, such as line 22 representing a junction between wall and ceiling, will be bent at the boundary of those two faces. This means the motion at the face boundary will be also discontinuous.

Figure 3A:
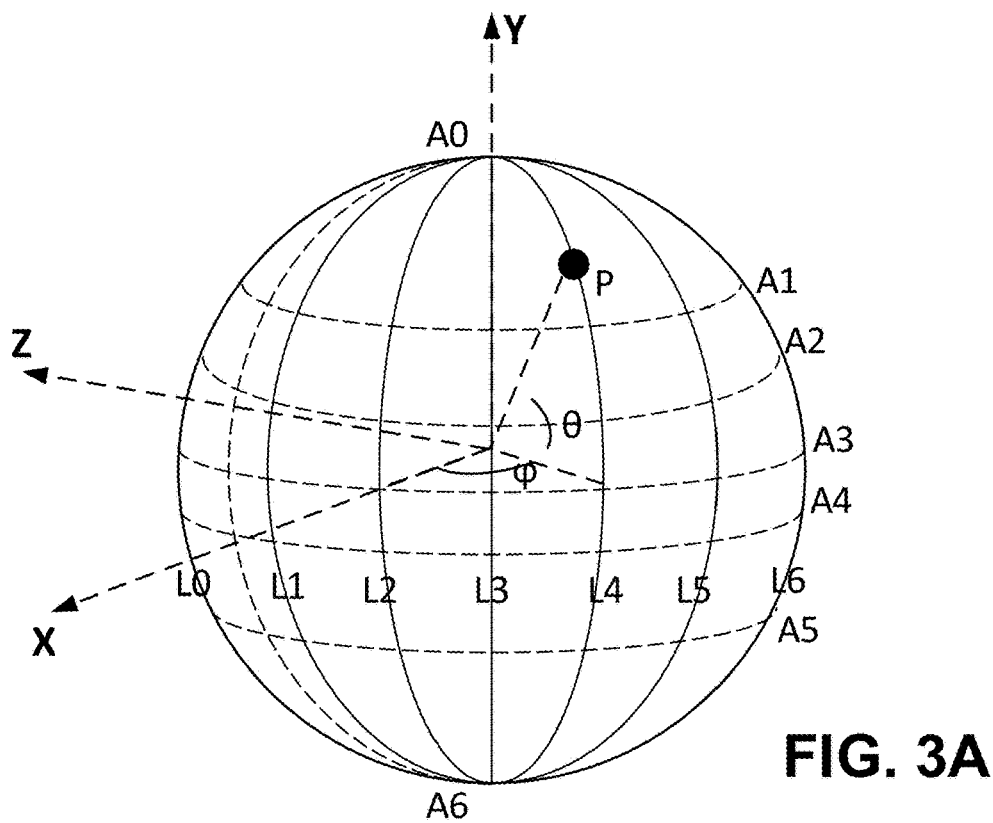
FIG. 3A illustrates sphere sampling in equal-area manner for equal-area projection.
Figure 3C:
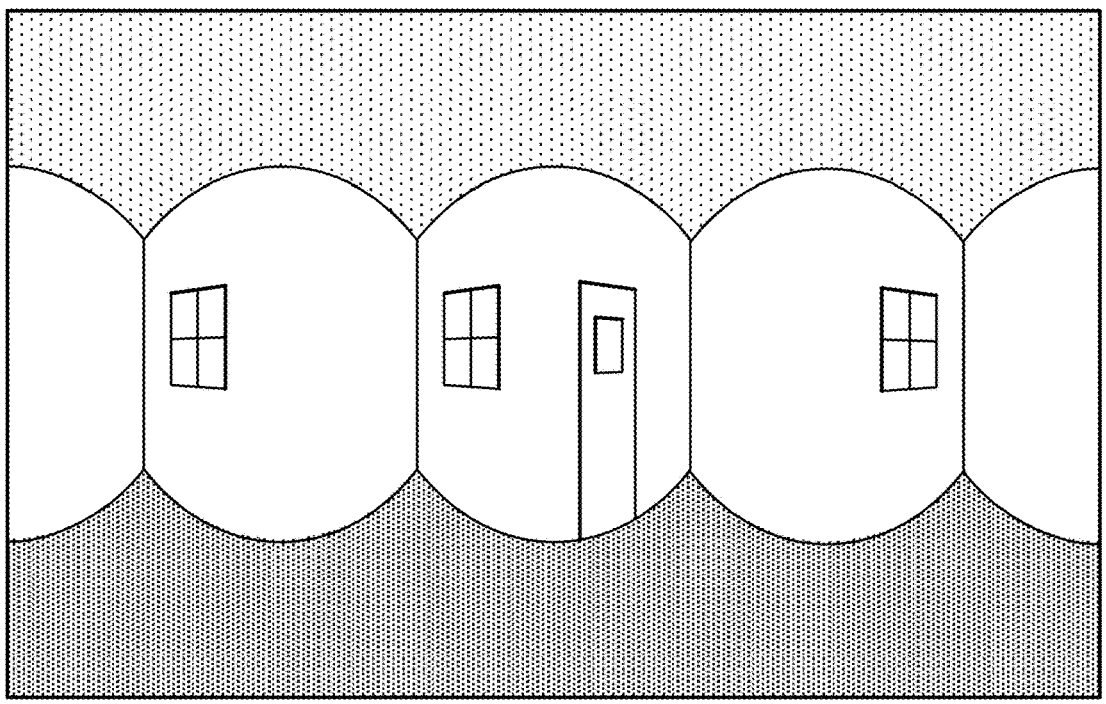
FIG. 3C schematically illustrates an example picture with equal-area projection.
Figure 3B:
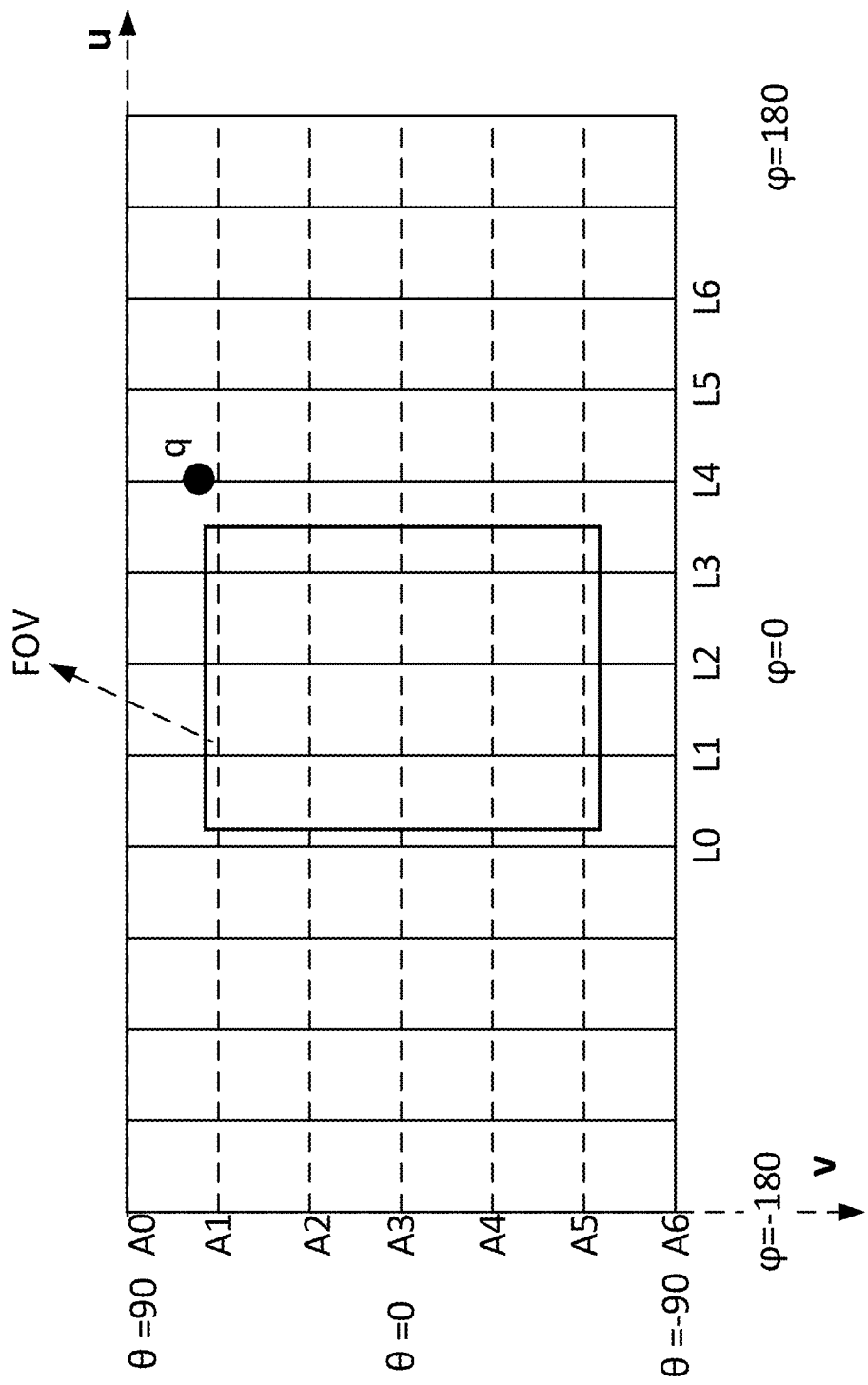
FIG. 3B illustrates the 2D plane of equal-area projection of FIG. 3A, where the point p on the sphere is projected to point q in the 2D plane, and the latitudes of horizontal lines (A0, A1, A2, etc.) are not at equal intervals.

FIGS. 3A-3B show an example geometry structure of equal-area projection. Different from equirectangular projection, the vertical sampling on the sphere is not based on the even interval of pitch. The projection on the Y axis of each sampled latitude is evenly distributed in order to achieve the same area for each sample on the sphere. The sampling in the vertical direction becomes sparser for those regions close to the pole region. It is also means there are more samples around the Equator. In practical situations, this is preferable because users generally view the region near the Equator more frequently than those regions near the Poles. FIG. 3C is a schematic illustration of an example picture with equal-area projection. Compared to FIG. 1C, regions in FIG. 3C around the Equator are scaled up while regions around the Pole are squeezed.

Figure 4A:
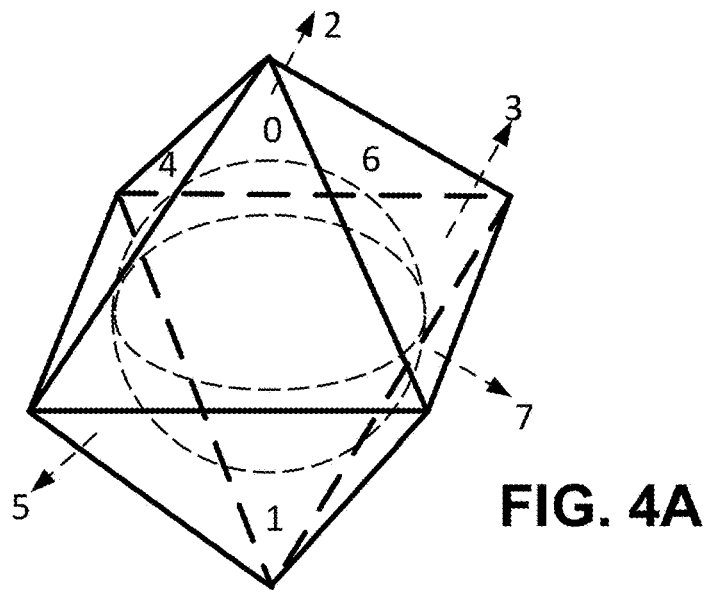
FIG. 4A illustrates octahedron projection with a 3D geometry structure.
Figure 4B:
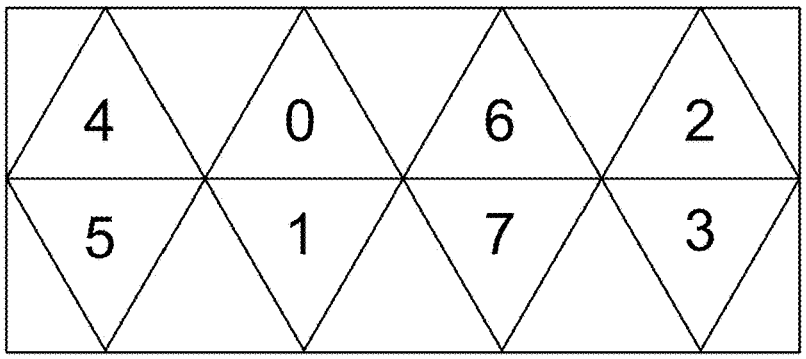
FIG. 4B illustrates 2D planar packing of the 3D structure of FIG. 4A.
Figure 4C:
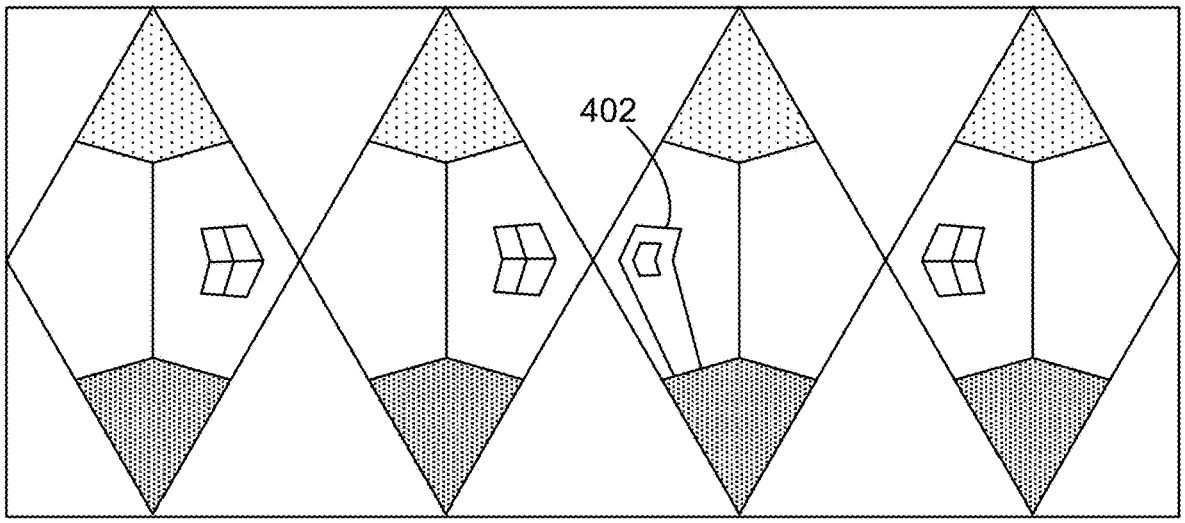
FIG. 4C schematically illustrates an example picture with octahedron projection.

FIG. 4A shows an example of the geometry structure of an octahedron projection. The octahedron consists of 8 equilateral triangle faces. If the radius of the tangent sphere is 1, then the lateral length of each triangle is √6. FIG. 4B shows one packing method to arrange 8 triangles into one rectangle. FIG. 4C schematically illustrates one example picture with octahedron projection. The warping distortion is observed at the corner of shared boundary of two neighboring triangles, as seen for example in the distortion of doorway 402.

In order to compare the coding efficiency of different geometry projection methods, Yu et al. proposed latitude-based PSNR (L-PSNR) in M. Yu, H. Lakshman, B. Girod, "A Framework to Evaluate Omnidirectional Video Coding Schemes", IEEE International Symposium on Mixed and Augmented Reality, 2015. It considers two factors: (1) even sampling on the sphere; (2) the viewer's viewing behavior. It defines some number of samples evenly distributed on the sphere, and it also defines the weight of a sample based on its latitude. The distortion is measured with weighted mean square error (MSE) by considering all those evenly distributed samples. The weight is derived by tracking the view angle of viewers when they view those training sequences. The weight is larger if it is viewed more frequently. From these statistics, the weights around the Equator are larger than those near the Poles because most interesting content is located around the Equator. Using those evenly distributed samples on the sphere provides one measure for comparing the performance of different projection methods. However, those pre-defined sphere samples may not be projected to the integer sampling positions when different projections are applied. If an interpolation filter based resampling method is applied, additional interpolation error will be introduced. If nearest neighboring sampling is applied, then evenly sampling is not guaranteed anymore. Therefore, the objective and subjective quality evaluation methods are still open topics for 360-degree video coding.

Equirectangular format is widely supported in the 360-degree cameras and stitching software. In order to encode 360-degree video in cubemap geometry, equirectangular format must be converted to cubemap format. The relationship between equirectangular and cubemap is as follows. In FIG. 2A, each face is referred to with each of the three axes going from the center of sphere to the center of face. With "P" standing for positive and "N" standing for negative, PX means the direction along positive X axis from the center of sphere, and NX is the reverse direction of PX, and analogous labeling for PY, NY, PZ, and NZ. Then there are 6 faces {PX, NX, PY, NY, PZ, NZ} corresponding to the front, back, top, bottom, right, and left faces, respectively, and those faces are indexed from 0 to 5. Let Ps (X_s, Y_s, Z_s) be the point on the sphere with radius being 1. It can be represented in yaw $\phi$ and pitch $\theta$ as follows:

$$X\_s = \cos(\theta)\cos(\phi) \quad (3)$$

$$Y\_s = \sin(\theta) \quad (4)$$

$$Z\_s = -\cos(\theta)\sin(\phi) \quad (5)$$

Let Pf be the point on the cube when extending the line from the sphere center to Ps. Without loss of generality, let Pf be on face NZ. The coordinates of Pf, (X_f, Y_f, Z_f), can be calculated as:

$$X\_f = X\_s / |Z\_s| \quad (6)$$

$$Y\_f = Y\_s / |Z\_s| \quad (7)$$

$$Z\_f = -1 \quad (8)$$

where |x| is the absolute value of variable x. Then the coordinates of Pf, (uc, vc), in the 2D plane of face NZ is calculated as:

$$uc = W*(1-X\_f)/2 \quad (9)$$

$$vc = H*(1-Y\_f)/2 \quad (10)$$

From Equations (3) to (10), a relationship can be built between the coordinates (uc, vc) in cubemap on a particular face and the coordinates ($\phi$, $\theta$) on the sphere. And the relationship between equirectangular point (ue, ve) and the point ($\phi$, $\theta$) on the sphere is known from Equations (1) and (2). So the relationship between equirectangular geometry and cubemap geometry can be found. The geometry mapping from cubemap to equirectangular can be summarized as follows. Given the point (uc, vc) on one face in cubemap, the output (ue, ve) on the equirectangular plane can be calculated as:
1) Calculate the coordinates of 3D point P_f on the face with (uc, vc) according to the relationship in Equations (9) and (10);
2) Calculate the coordinates of 3D point P_s on the sphere with P_f according to the relationship in Equations (6), (7), and (8);
3) Calculate the ($\phi$, $\theta$) on the sphere with P_s according to the relationship in Equations (3), (4), and (5);
4) Calculate the coordinates of point (ue, ve) on the equirectangular picture from ($\phi$, $\theta$) according to the relationship in Equations (1) and (2).

In order to represent the 360-degree video in one 2D picture using cubemap, the 6 faces of the cubemap can be packed into one rectangular area, which is known as frame packing. The frame packed pictures are then treated (e.g., coded) as one normal 2D picture. There are different frame packing configurations, such as 3×2 and 4×3. In the 3×2 configuration, the 6 faces are packed into 2 rows, with 3 faces in one row. In the 4×3 configuration, the 4 faces PX, NZ, NX, PZ are packed into one row (e.g., the center row), and the faces PY and NY are separately packed into two different rows (e.g., the top and bottom rows). The example of FIG. 2C makes use of 4×3 frame packing that corresponds to the equirectangular picture in FIG. 1C.

In an exemplary scenario, a 360-degree video in equirectangular format is taken as input, and it is desired to convert the input into cubemap format. The following steps are applied:
1) For each sample position (uc, vc) in cubemap format, calculate the corresponding coordinates (ue, ve) in equirectangular format by the method introduced above.
2) If the coordinates (ue, ve) in equirectangular thus calculated are not at integer sample position, interpolation filter may be applied to obtain the sample value at this fractional position using samples at its neighboring integer positions.

Figure 5:
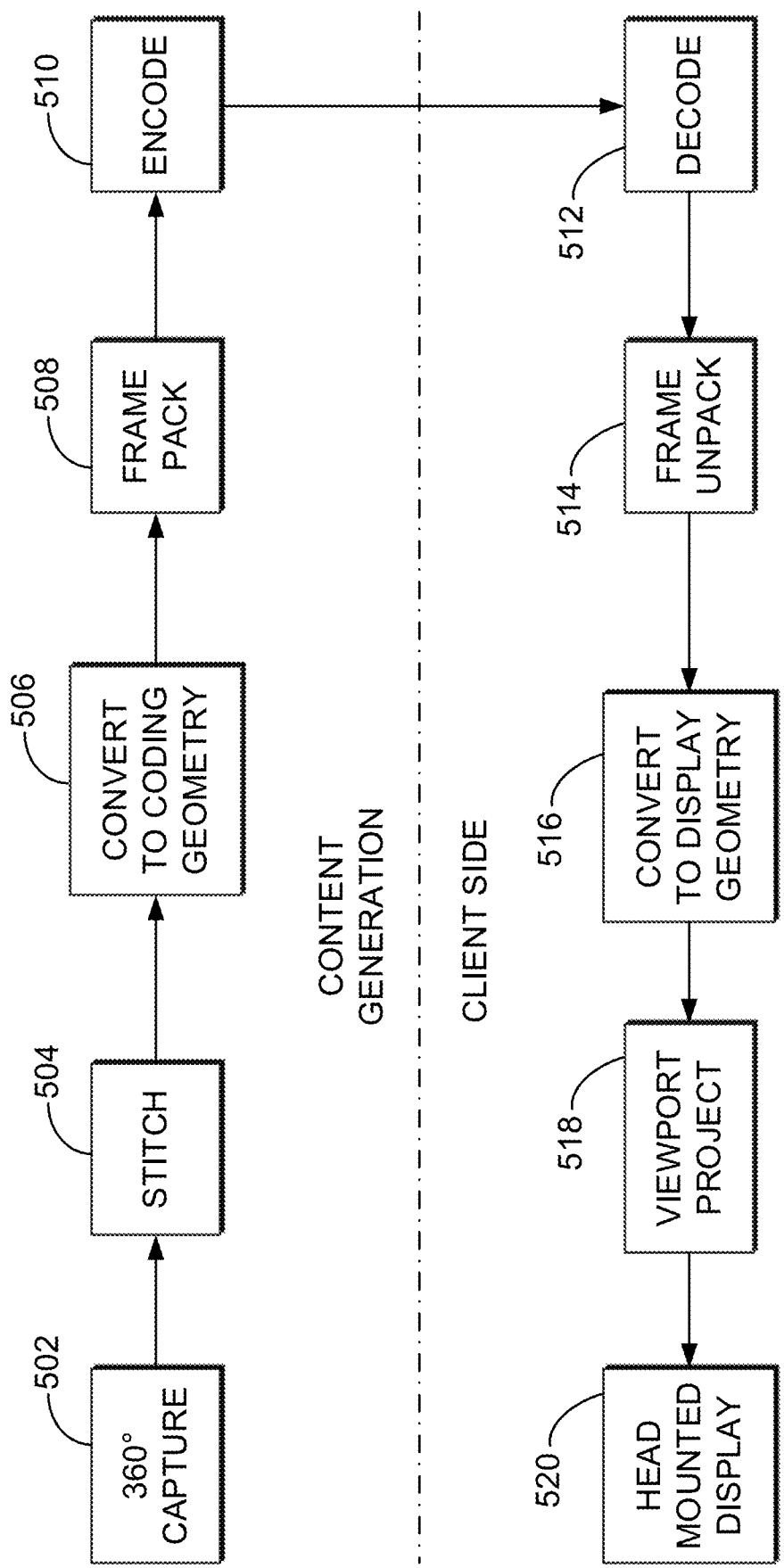
FIG. 5 illustrates one embodiment of a 360-degree video processing workflow.

One work flow for a 360-degree video system is depicted in FIG. 5. It includes 360-degree video capture 502, such as using multiple cameras to capture videos covering the whole sphere space. Then those videos are stitched together (504), for example in an equirectangular geometry structure. The equirectangular geometry structure can be converted to another geometry structure (506), such as cubemap, for encoding, such as encoding with existing video codecs. Frame packing 508 may be performed prior to encoding 510. The coded video is delivered to the client via, for example, dynamic streaming or broadcasting. At the receiver, the video is decoded (512), and the decompressed frame is unpacked (514) and converted (516) to a display geometry (e.g., equirectangular). Then it can be used for rendering 518 via viewport projection according to a user's viewing angle and displayed on a head-mounted display 520.

In professional and/or consumer video applications, the chroma components are often subsampled to be a smaller resolution than that of the luma component. Chroma subsampling reduces the amount of video data to be encoded (and therefore saving bandwidth and computing power) without significantly affecting the video quality. For example, one of the widely used chroma formats is called the 4:2:0 chroma format, where both of the chroma components are subsampled to be ¼ of the luma resolution (½ horizontally and ½ vertically). After chroma subsampling, the chroma sampling grid may have become different from the luma sampling grid. In FIG. 5, throughout the processing flow, the 360-degree video being processed at each stage may be in a chroma format in which the chroma components have been subsampled.

Figure 6:
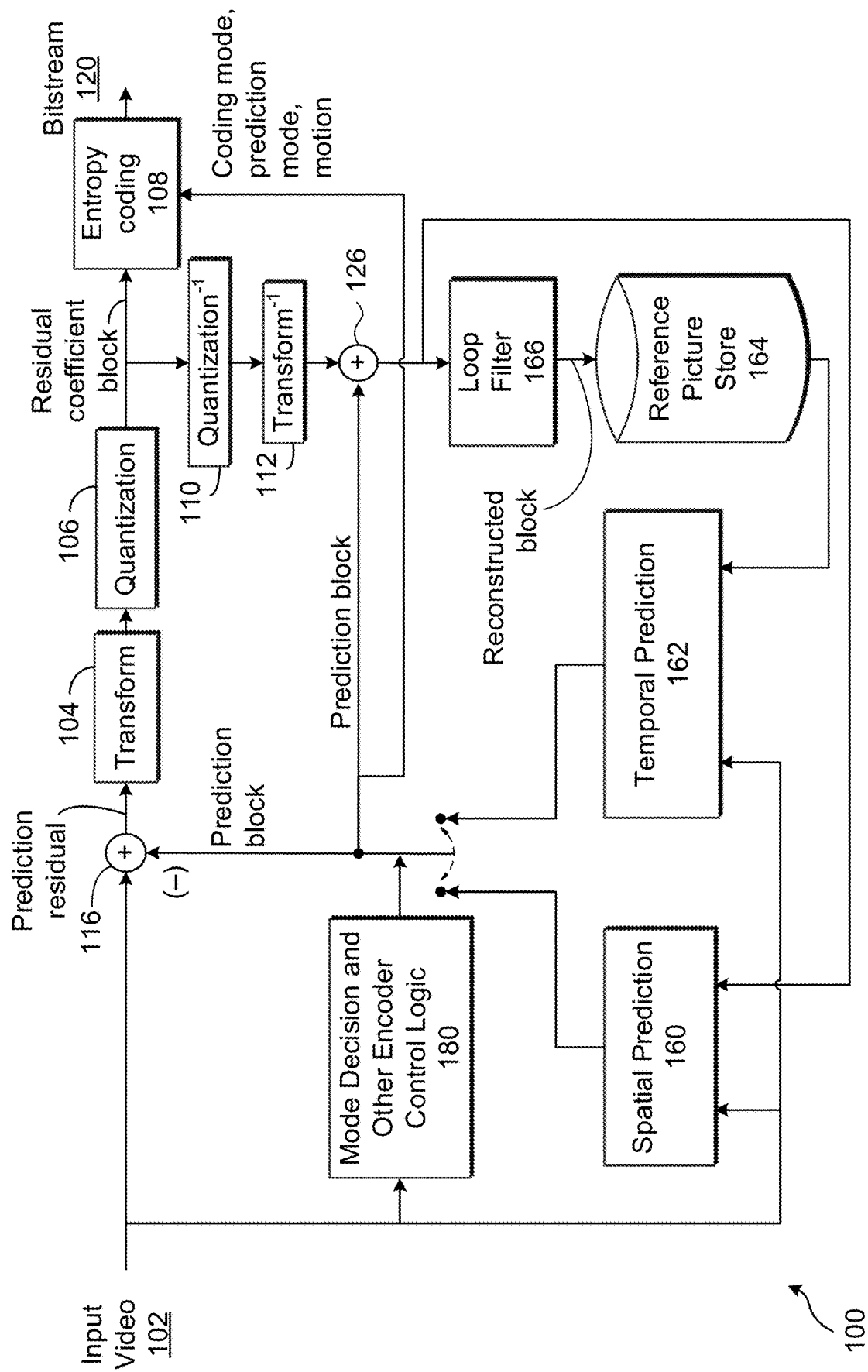
FIG. 6 illustrates one embodiment of a functional block diagram of block-based video encoder.

FIG. 6 is a block diagram of one embodiment of a generic block-based hybrid video encoding system. The input video signal 102 is processed block by block. In HEVC, extended block sizes (called a "coding unit" or CU) are used to efficiently compress high resolution (e.g., 1080p and beyond) video signals. In HEVC, a CU can be up to 64×64 pixels. A CU can be further partitioned into prediction units or PU, for which separate prediction methods are applied. For each input video block (MB or CU), spatial prediction (160) and/or temporal prediction (162) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses pixels from the already coded video pictures to predict the current video block. Temporal prediction reduces temporal redundancy inherent in the video signal. Temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is also sent; and the reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106) to achieve the target bit-rate. The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Figure 7:
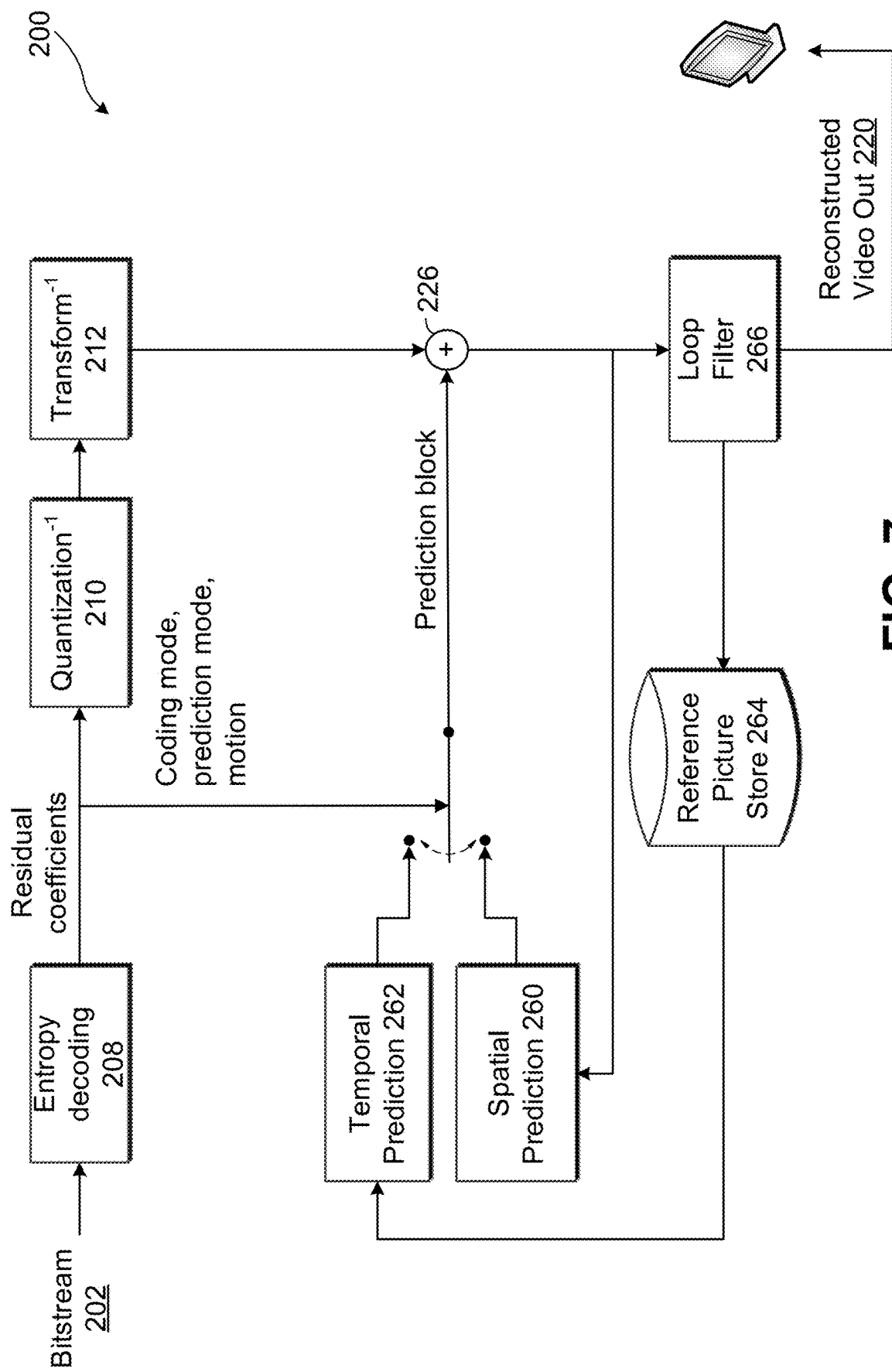
FIG. 7 illustrates one embodiment of a functional block diagram of a video decoder.

FIG. 7 is general block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in the reference picture store is then sent out to drive a display device, as well as used to predict future video blocks.

OVERVIEW OF EXEMPLARY EMBODIMENTS

The 360-degree video data may be projected onto a 2D plane to encode the information using conventional 2D planar video coding. As there are many geometric projections that can be used to represent 360-degree data and the projected data can be packed in different configurations, this leads to various issues.

One issue is that, to be able to properly reconstruct the 360-video from the decoded 2D planar video, the geometry and frame packing parameters should be available to the decoder to unpack the data and project it back from the 2D space to the 3D space. For example, the cubemap format can be represented using different arrangements, such as 3×2, 4×3, 1×6, or 6×1, with different face orders, different face rotations, or different face sizes. Additionally, if a different format than the coding format is used at the receiver side, then the geometry and frame packing parameters are also required to convert the coding format to the required format. For example, if the coding format is cubemap but the display format is equirectangular, then a conversion has to be performed. In a practical way, it is better for the file format multiplexer to extract those frame packing arrangement information from the video itself instead of depending on external metadata when it multiplexes those elementary streams.

Another issue is that, with some frame packing configurations, it may be beneficial for storage or compression purposes to pad the unwrapped faces such that the resulting frame packed picture forms a rectangular area. For example, in the cubemap 4×3 format, additional pixels have to be added at the top right and bottom right edges (see FIGS. 2B and 2C). Encoding these additional pixels consume bits, but does not convey any meaningful information. Therefore, bit rate savings can be achieved if these pixels are skipped by the encoder. In this case, it should be signaled to the decoder that a compact configuration is used for correct reconstruction of 360-degree video. Further, unlike conventional 2D planar video, at any time while playing back the video, only a portion of the 360 video (e.g., the viewport) is rendered and displayed to the user (see FIG. 5). Statistics show that the viewing probability is generally higher around the equator than around the poles and higher near the front view than near the back view. Therefore, information identifying the projection format will allow the encoder to identify these areas (that is, equator vs poles and front vs back) in the projected 2D video, and apply different encoding strategies (e.g., spending more bits and/or applying more complicated optimization strategies to the areas corresponding to the equator and/or front areas, and spending fewer bits and/or applying simpler optimization strategies to the areas corresponding to the poles and/or back) to allocate bits and/or computing resource in a more intelligent way by exploiting the user's viewing behavior.

A further issue is that existing codecs, such as MPEG-2, H.264, and HEVC, are specially designed for conventional 2D video and do not consider any property of the 360-degree data representation. To achieve better compression efficiency, advanced 360-video coding tools may take advantage of the full 3D representation, but these tools may benefit from information about the geometry and frame packing as the coding is performed on the projected 2D planar video. Therefore, information regarding the geometry and frame packing parameters may be made available to both the encoder and the decoder to be able to properly and more efficiently encode and decode the 360-video. For example, in the cubemap format, the unfolded faces have only a few correctly positioned neighboring faces on the 2D planar video, which limits the capacity of the codec to exploit redundant information between neighboring faces. However, if the codec has information regarding the 3D representation, where each face of the cube has exactly 4 neighboring faces, then more redundant information can be exploited to reduce the amount of data that has to be encoded.

An additional issue is that geometry and frame packing parameters may vary over the duration of the 360-degree video. Therefore, if the geometry and frame packing parameters change over time, these parameters should be available to the encoder and the decoder for each frame of the 360-video. For example, the coding format may change from cubemap to equirectangular at a particular time instant to achieve better compression performance, or the size of a particular set of cubemap faces may change to accommodate lower or higher bandwidth requirements during a specific video segment.

Systems and methods disclosed herein address these issues, and others.

In some embodiments, one or more of the issues set forth above for 360-degree video coding are addressed by signaling the geometry and frame packing parameters in the bitstream by means of additional high-level syntax elements. In particular, the projection geometry type can be specified, including different parameters for the geometry faces to locate them on the 2D planar video. The 360-video parameters can be signaled at different levels. One section below describes how the projection formats parameters can be stored at the video level (e.g., video parameter set or VPS level) to minimize the amount of information that has to be transmitted when different layers and/or sequences and/or picture use the same projection format. Another section below presents how the projection format can be signaled at sequence level (e.g., sequence parameter set or SPS level), allowing different sequences of the same video to use different projection formats, or change parameters related to a given projection format. Another section below presents how the projection format can be signaled at the picture level (e.g., picture parameter set or PPS level), allowing different pictures of the same sequence to use different projection formats, or change parameters related to a given projection format. Another aspect of the systems and methods disclosed herein is to enable encoding of the different geometry faces with different quality factors. For example, in the cubemap format, the front, back, left, and right faces may be coded with higher quality, whereas the top and bottom faces may be coded with lower quality. This is because the viewers are more likely to watch areas around the horizon than near the poles. In this way, the 360-video can be coded more efficiently.

In some embodiments, systems and methods for specifying the rotation of the geometry coordinate system relatively to an absolute coordinate system are introduced. These systems and methods may be used to rotate the 3D geometry such that the object or region of interest is projected into a face or set of faces that may be encoded with higher quality. Similarly, if an object or region of interest is split over several faces, which may reduce the redundancy within each face, the geometry rotation may be used to define a different orientation such that one or more important objects can be placed within one face such that better compression efficiency may be achieved. In some cases, when this is not possible, for example if an object is large and/or close enough that it spans over 90-degrees in one or both of the horizontal and vertical directions, the faces may be rotated such that as great a portion as possible of the important object(s) are placed within one face. Due to the intrinsic nature of 3D geometry, when an object spans over more than one face, its geometric structure will be "distorted" when transitioning from one face to another, thus reducing the correlation and coding efficiency. Being able to specify a projection orientation such that object continuity within one face is maximized can improve coding efficiency.

360-Degree Video Property Signaling at Video Level.

The different projection geometries have different characteristics. For example, there is only one face for equirectangular projection and equal-area projection. There is no face boundary issue, though the picture is stretched. The cubemap has six faces and has many face boundaries in the frame-packed picture. Each picture may be coded in a different projection geometry or with the same geometry but with different face arrangements, sizes, or quality. For this purpose, a new parameter set may be introduced in some embodiments for 360-video as depicted in Table 1.

TABLE 1

| Video parameter set RBSP | |
|---|---|
| | Descriptor |
| video_parameter_set_rbsp( ) {<br>...<br>  vps_360_extension_flag<br>  if( vps_360_extension_flag )<br>    vps_360_extension( )<br>...<br>} | u(1) |

In an exemplary embodiment, the flag vps_360_extension_flag may have the following semantics.

vps_360_extension_flag: specifies whether the video is a 360-degree video, in which case specific parameters and tools for efficient representation and compression of 360-video may be used. When not present, the value of vps_360_extension_flag can be inferred to be equal to 0.

At the video level, the total number of projection formats used in the different sequences and/or layers may be signaled in some embodiments according to Table 2.

TABLE 2

| Video parameter set 360 extension syntax | |
|---|---|
| | Descriptor |
| vps_360_extension ( ) {<br>  vps_num_360_formats_minus1<br>  for( i = 0; i <= vps_num_360_formats_minus1; i++ )<br>    360_format( )<br>  if( vps_num_360_formats_minus1 > 0 )<br>    360_format_idx_present_flag<br>  if( 360_format_idx_present_flag )<br>    for( i = 0; i <= MaxLayersMinus1; i++ )<br>      vps_360_format_idx[i]<br>} | ue(v)<br><br><br><br>u(1)<br><br><br>ue(v) |

In an exemplary embodiment, the parameters of Table 2 may have the following semantics.

vps_num_360_formats_minus1: specifies the number (minus 1) of projection formats used in the different sequences and/or layers. When not present, the value of vps_num_360_formats_minus1 can be inferred to be equal to 0, indicating that only one projection format is used.

360_format_idx_present_flag: specifies whether the syntax elements vps_360_format_idx[i] are present or not. When not present, the value of 360_format_idx_present_flag can be inferred to be equal to 0.

vps_360_format_idx[i]: specifies the index, into the list of 360_format( ) syntax structures in the VPS, of the 360_format( ) syntax structure that applies to the layer with nuh_layer_id equal to layer_id_in_nuh[i]. When not present, the value of vps_rep_format_idx[i] can be inferred to be equal to Min(i, vps_num_rep_formats_minus1).

With this proposed syntax structure, in a multi-layer video stream, the projection format for each layer may be different. For example, the projection format for each layer may be determined at the encoder using rate-distortion optimization. The encoder can encode the current layer with all available projection formats and subsequently measure the rate-distortion cost. If the current layer is an enhancement layer, it may be encoded with not only intra and inter prediction in the same layer, but also inter-layer prediction from another layer (e.g., a reference layer) of the same or different projection format. When the projection format from the reference layer is different from that of the current layer, the inter-layer prediction process may further include projection format conversion. Finally, the projection format that results in minimum rate-distortion cost may be selected for final coding.

In some embodiments, the properties of each projection format and associated parameters may be signaled according to Table 3.

TABLE 3

360-degree representation format syntax

| | Descriptor |
|---|---|
| 360_format( ) { | |
|   projection_geometry | ue(v) |
|   geometry_rotation_param_present_flag | u(1) |
|   if( geometry_rotation_param_present_flag ) { | |
|     geometry_rotation_yaw | ue(v) |
|     geometry_rotation_pitch | ue(v) |
|     geometry_rotation_roll | ue(v) |
|   } | |
|   compact_representation_enabled_flag | u(1) |
|   loop_filter_across_faces_enabled_flag | u(1) |
|   num_face_rows | ue(v) |
|   num_face_columns | ue(v) |
|   equal_face_size_flag | u(1) |
|   if( num_face_rows * num_face_columns > 1 ) | |
|     face_qp_offset_enabled_flag | u(1) |
|   for( i = 0; i < num_face_rows; i++ ) { | |
|     for( j = 0; j < num_face_columns; j++ ) { | |
|       face_idx[i][j] | ue(v) |
|       if( !equal_face_size_flag ) { | |
|         face_width_in_luma_samples[i][j] | ue(v) |
|         face_height_in_luma_samples[i][j] | ue(v) |
|       } | |
|       face_rotation_idc[i][j] | ue(v) |
|       if( face_rotation_idc[i][j] == 4 ) | |
|         face_rotation[i][j] | ue(v) |
|       face_vertical_flip_flag[i][j] | u(1) |
|       if( face_qp_offset_enabled_flag ) | |
|         face_qp_offset[i][j] | se(v) |
|     } | |
|   } | |
| } | |

In an exemplary embodiment, the parameters of Table 3 may have the following semantics.

projection_geometry: specifies the mapping index in Table 4 of the used projection geometry.

geometry_rotation_param_present_flag: specifies whether the syntax elements geometry_rotation_yaw, geometry_rotation_pitch, and geometry_rotation_roll are present. When not present, the value of geometry_rotation_param_present_flag can be inferred to be equal to 0.

geometry_rotation_yaw: specifies the rotation around the Y axis (see FIG. 2A) of the geometry coordinate system relatively to an absolute coordinate system. When not present, the value of geometry_rotation_yaw can be inferred to be equal to 0.

geometry_rotation_pitch: specifies the rotation around the Z axis (see FIG. 2A) of the geometry coordinate system relatively to an absolute coordinate system. When not present, the value of geometry_rotation_pitch can be inferred to be equal to 0.

geometry_rotation_roll: specifies the rotation around the X axis (see FIG. 2A) of the geometry coordinate system relatively to an absolute coordinate system. When not present, the value of geometry_rotation_roll can be inferred to be equal to 0.

compact_representation_enabled_flag: specifies whether the samples or blocks used for padding the frame packed image into a rectangular picture are skipped by the encoder. When not present, the value of compact_representation_enabled_flag can be inferred to be equal to 0.

loop_filter_across_faces_enabled_flag: specifies whether in-loop filtering operations may be performed across face boundaries. When not present, the value of loop_filter_across_faces_enabled_flag can be inferred to be equal to 1.

num_face_rows: specifies the number of face rows in the frame packed picture. When not present, the value of num_face_rows can be inferred to be equal to 1.

num_face_columns: specifies the number of face columns in the frame packed picture. When not present, the value of num_face_columns can be inferred to be equal to 1.

Note that, instead of signaling num_face_rows and num_face_columns, num_face_rows_minus1 and num_face_columns_minus1 may be signaled to reduce the number of bits needed to code these syntax elements.

equal_face_size_flag: specifies whether all faces share the same size (the same width and height). When not present, the value of equal_face_size_flag can be inferred to be equal to 0. When equal_face_size_flag is set to 1, the width and height of all faces in the frame packed picture can be inferred based on the projection_geometry. For example, with the cubemap projection, the width in luma samples of all faces in the frame packed picture can be inferred to be equal to pic_width_in_luma_samples/num_face_columns, while the height in luma samples of all faces in the frame packed picture can be inferred to be equal to pic_height_in_luma_samples/num_face_rows. Note that the width and height in luma samples of all faces in the frame packed picture shall not be equal to 0 and shall be an integer multiple of MinCbSizeY.

face_qp_offset_enabled_flag: specifies whether different QPs are used for the different faces. When not present, the value of face_qp_offset_enabled_flag can be inferred to be equal to 0.

face_idx[i][j]: specifies the index of the face located at the i-th row and j-th column in the frame packed picture. For simple geometries with only a single face, such as equirectangular or equal-area, the only face is face #0. For other geometries, a default numbering and positioning of the faces can be used, as illustrated in Table 5 for the cubemap and octahedron geometries.

face_width_in_luma_samples[i][j]: specifies the width in luma samples of the face located at the i-th row and j-th column in the frame packed picture. Techniques may be employed to prevent ambiguity with respect to the frame-packed picture width. For example, it can be enforced that the sum of the different face widths along each row is equal to the frame-packed picture width. face_width_in_luma_samples[i][j] shall not be equal to 0 and shall be an integer multiple of MinCbSizeY.

face_height_in_luma_samples[i][j]: specifies the height in luma samples of the face located at the i-th row and j-th column in the frame packed picture. Techniques may be employed to prevent ambiguity with respect to the frame-packed picture height. For example, it can be enforced that the sum of the different face heights along each column is equal to the frame-packed picture height. face_height_in_luma_samples[i] [j] shall not be equal to 0 and shall be an integer multiple of MinCbSizeY.

face_rotation_idc[i][j]: specifies the mapping index in Table 6 of the rotation between the face coordinate system and the picture coordinate system of the face located at the i-th row and j-th column in the frame packed picture. When not present, the value of face_rotation_idc[i][j] can be inferred to be equal to 0.

face_rotation[i][j]: specifies the degree of rotation between the face coordinate system and the picture coordinate system of the face located at the i-th row and j-th column in the frame packed picture.

face_vertical_flip_flag[i] [j]: specifies whether the face located at the i-th row and j-th column in the frame packed picture is flipped vertically after rotation. When not present, the value of face_vertical_flip_flag[i] [j] can be inferred to be equal to 0.

face_qp_offset[i][j]: specifies the difference to be added to the sequence level QP when determining the QP value of the face located at the i-th row and j-th column in the frame packed picture.

TABLE 4

Projection geometry indices

| Index | Projection geometry |
|---|---|
| 0 | Equirectangular |
| 1 | Cubemap |
| 2 | Equal-area |
| 3 | Octahedron |
| 4 | Icosahedron |
| 5 | Cylinder |
| 6 | User specified polygon |

TABLE 5

Default face definition

Figure 8A:
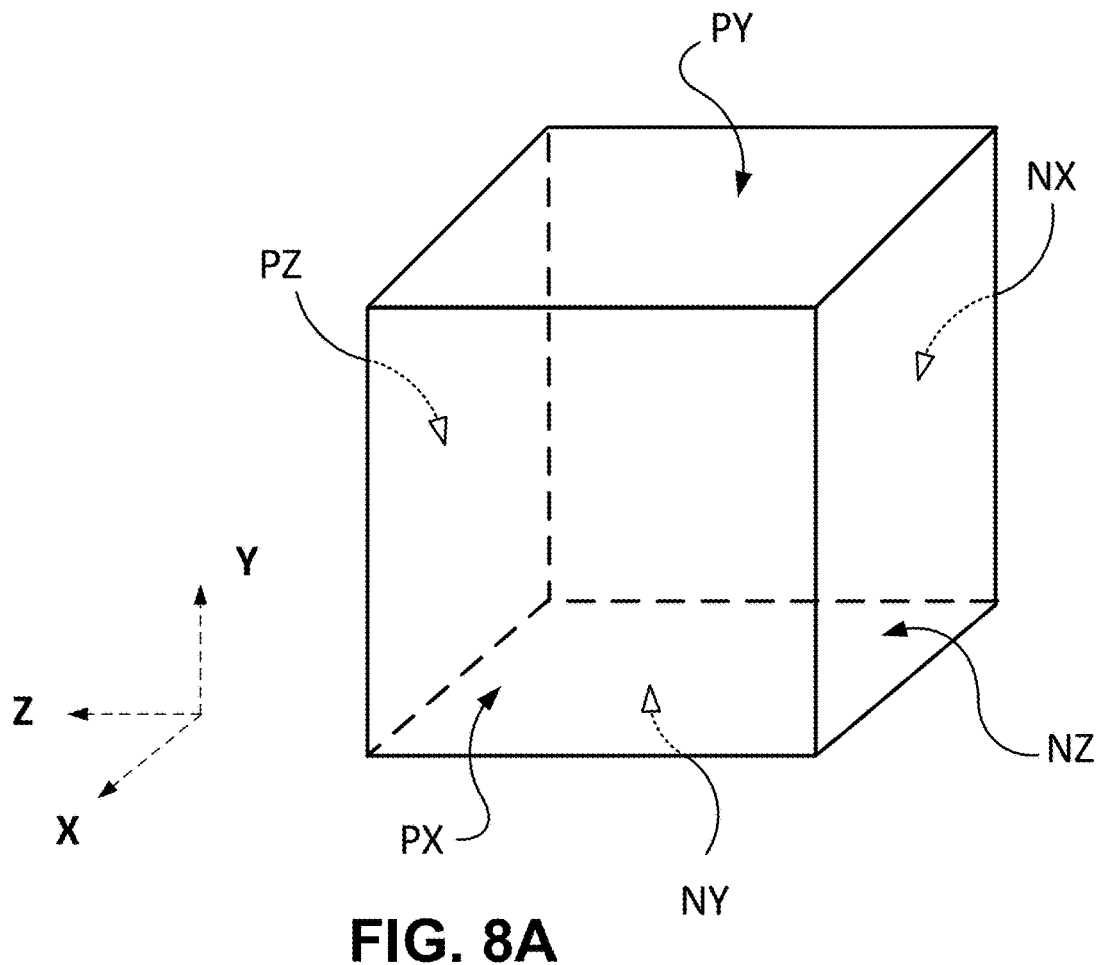
FIG. 8A illustrates one embodiment of a physical layout of a cubemap projection format.
Figure 8B:
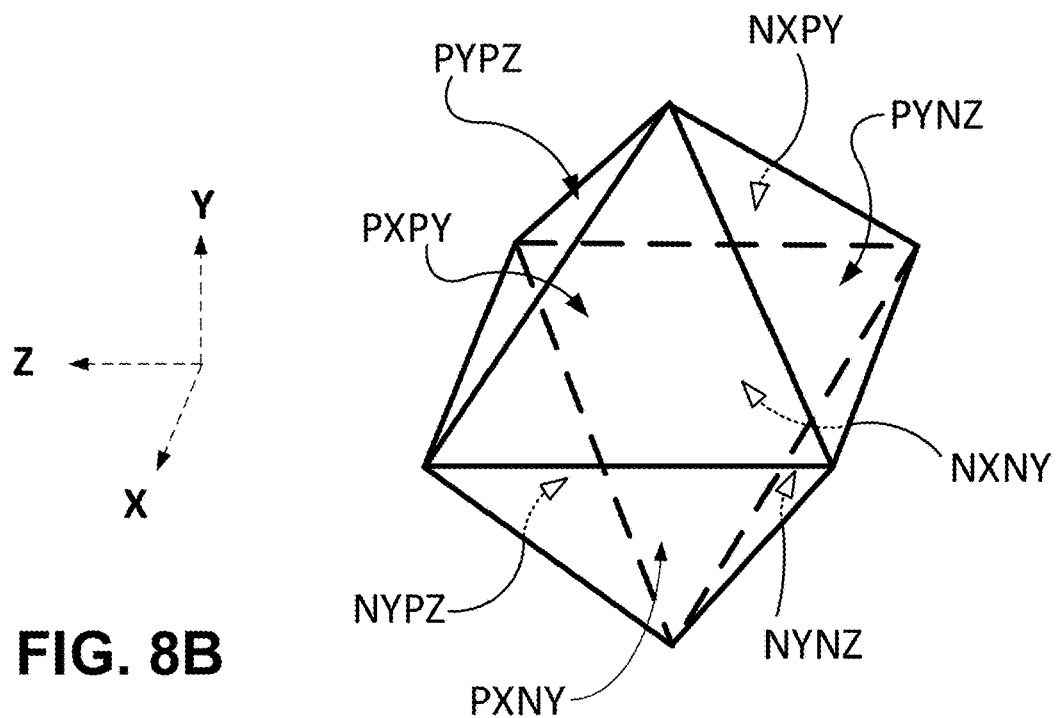
FIG. 8B illustrates one embodiment of a physical layout of an octahedron projection format.

| Geometry | Face definition |
|---|---|
| Cubemap | 0: PX, 1: NX, 2: PY, 3: NY, 4: PZ, 5: NZ (see FIG. 8A) |
| Octahedron | 0: PXPY, 1: PXNY, 2: NXPY, 3: NXNY, 4: PYPZ, 5: NYPZ, 6: PYNZ, 7: NYNZ (see FIG. 8B) |

TABLE 6

Rotation indices

| Index | Rotation in counter-clockwise |
|---|---|
| 0 | 0 |
| 1 | 90 |
| 2 | 180 |
| 3 | 270 |
| 4 | User specified |

Figure 9A:
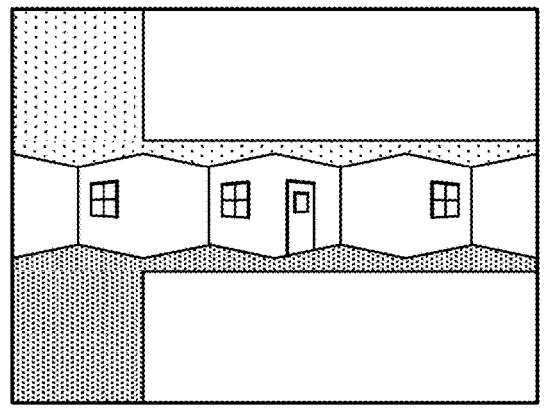
FIG. 9A illustrates a cubemap represented in 4×3 format.
Figure 9B:
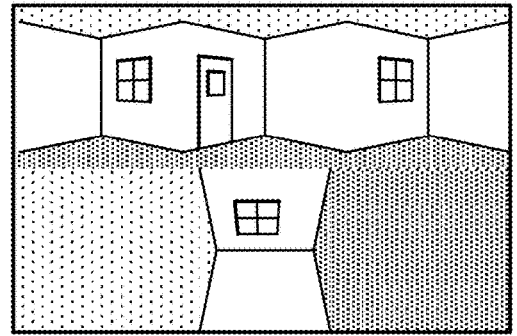
FIG. 9B illustrates a cubemap represented in 3×2 format.
Figure 9C:
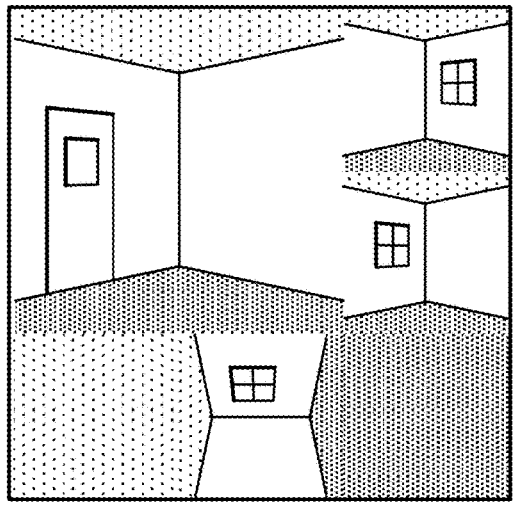
FIG. 9C illustrates a cubemap represented in 3×3 format with the front face twice the size (four times the area) of the other faces (in this case, the front face spreads over two rows and two columns).

Considering the frame packed picture as a face grid, these parameters can be used for a very flexible yet powerful signaling of the geometry format. For projection geometry resulting in a single face, such as equirectangular, equal-area, or cylinder, the parameters num_face_rows, num_face_columns, face_idx, face_width_in_luma_samples, face_height_in_luma_samples, and face_rotation can be inferred from the geometry and the picture size. However, for other geometries, such as cubemap, octahedron, or icosahedron, it is desirable to specify these parameters as the faces may be arranged in different ways or have different sizes. For example, as illustrated in FIGS. 9A-9C, the same cubemap projection can be packed in different ways, such as (a) a 3×4 grid (FIG. 9A) or (b) a 2×3 grid (FIG. 9B). In the case of the 3×4 grid, face_idx can be set to a value higher than the actual face number, which can be inferred from the geometry, to indicate positions in the grid that do not contain actual faces. For example, we can set the parameters as follows:

| projection_geometry = 1 // cubemap | |
|---|---|
| face_idx[0][0] = 2 | // face #2 |
| face_idx[0][1] = 6 | // invalid face |
| face_idx[0][2] = 7 | // invalid face |
| face_idx[0][3] = 8 | // invalid face |
| face_idx[1][0] = 1 | // face #1 |
| face_idx[1][1] = 4 | // face #4 |
| face_idx[1][2] = 0 | // face #0 |
| face_idx[1][3] = 5 | // face #5 |
| face_idx[2][0] = 3 | // face #3 |
| face_idx[2][1] = 9 | // invalid face |
| face_idx[2][2] = 10 | // invalid face |
| face_idx[2][3] = 11 | // invalid face |

To provide better details in some directions, certain faces may be encoded with higher resolution. This is because the viewers are more likely to watch some areas than others, especially near the frontal direction. In this way, the 360-degree video can be coded more efficiently. For this purpose, the face_width_in_luma_samples and face_height_in_luma_samples parameters can be used to specify different sizes for the different faces. For example, in the cubemap format, the front face can be coded with higher resolution than the other faces, as illustrated in FIG. 9C, and we can set the parameters as follows:

| projection_geometry = 1 | | |
|---|---|---|
| face_idx[0][0] = 0 | face_width_in_luma_samples[0][0] = 2W | face_height_in_luma_samples[0][0] = 2H |
| face_idx[0][1] = 0 | face_width_in_luma_samples[0][1] = 2W | face_height_in_luma_samples[0][1] = 2H |
| face_idx[0][2] = 4 | face_width_in_luma_samples[0][2] = W | face_height_in_luma_samples[0][2] = H |
| face_idx[1][0] = 0 | face_width_in_luma_samples[1][0] = 2W | face_height_in_luma_samples[1][0] = 2H |
| face_idx[1][1] = 0 | face_width_in_luma_samples[1][1] = 2W | face_height_in_luma_samples[1][1] = 2H |
| face_idx[1][2] = 5 | face_width_in_luma_samples[1][2] = W | face_height_in_luma_samples[1][2] = H |
| face_idx[2][0] = 2 | face_width_in_luma_samples[2][0] = W | face_height_in_luma_samples[2][0] = H |
| face_idx[2][1] = 1 | face_width_in_luma_samples[2][1] = W | face_height_in_luma_samples[2][1] = H |
| face_idx[2][2] = 3 | face_width_in_luma_samples[2][2] = W | face_height_in_luma_samples[2][2] = H |

Where W is the face width in luma samples and H is the face height in luma samples of all other faces except face 0 (the front face).

From these parameters, it can be inferred that the front face spans over 4 grid positions because its size is twice as big as the other faces and the information can be retrieved properly.

Faces may be arranged with different orientations. For example, as illustrated for the cubemap projection, faces "2", "1", and "3" are rotated by 90-degree counter-clockwise in the 2×3 grid of FIG. 9B when compared to the 3×4 grid of FIG. 9A. The face_rotation_idc parameter can be used to specify the rotation between the face coordinate system and the frame packed picture coordinate system.

Figure 11B:
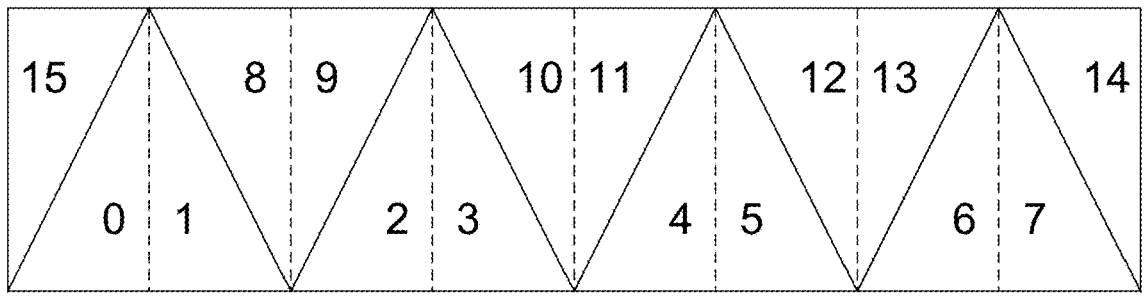
FIG. 11B illustrates a compact frame packing format for an octahedron.
Figure 12B:
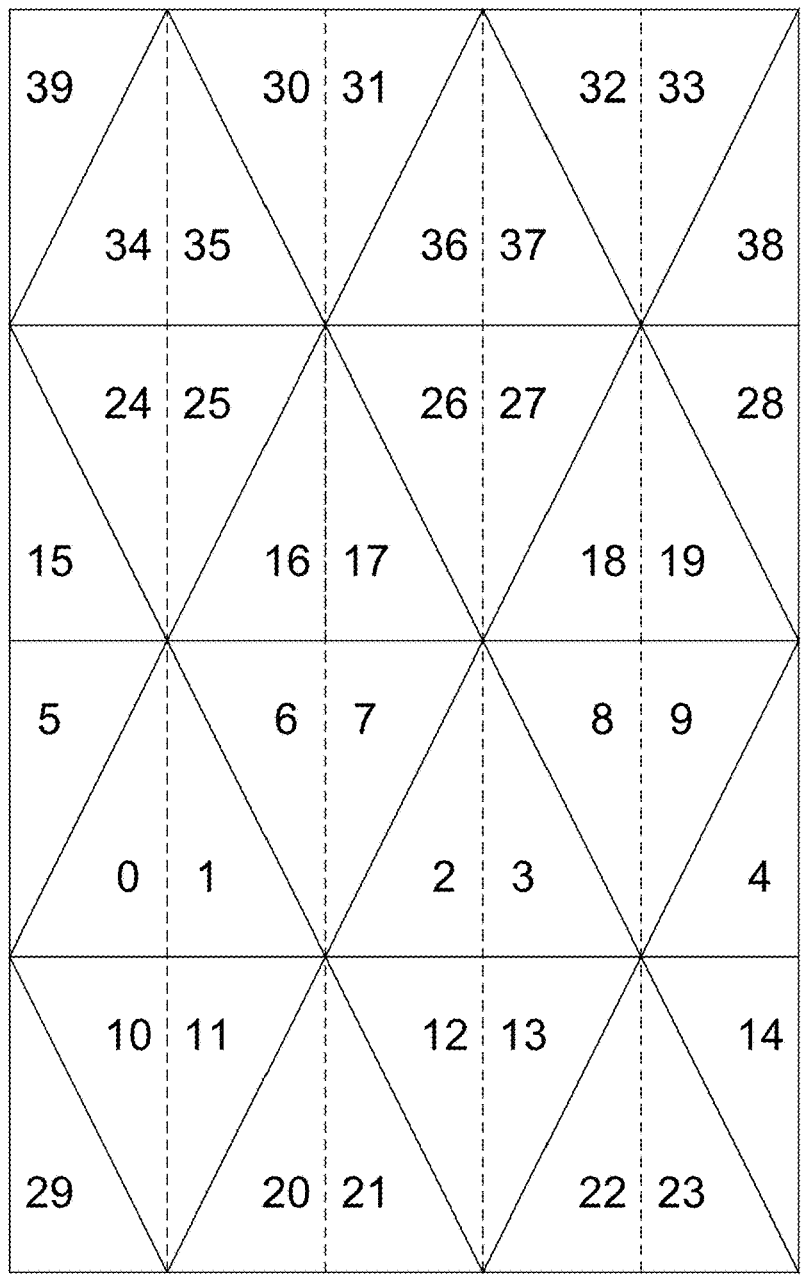
FIG. 12B illustrates a compact frame packing format for an icosahedron.
Figure 12A:
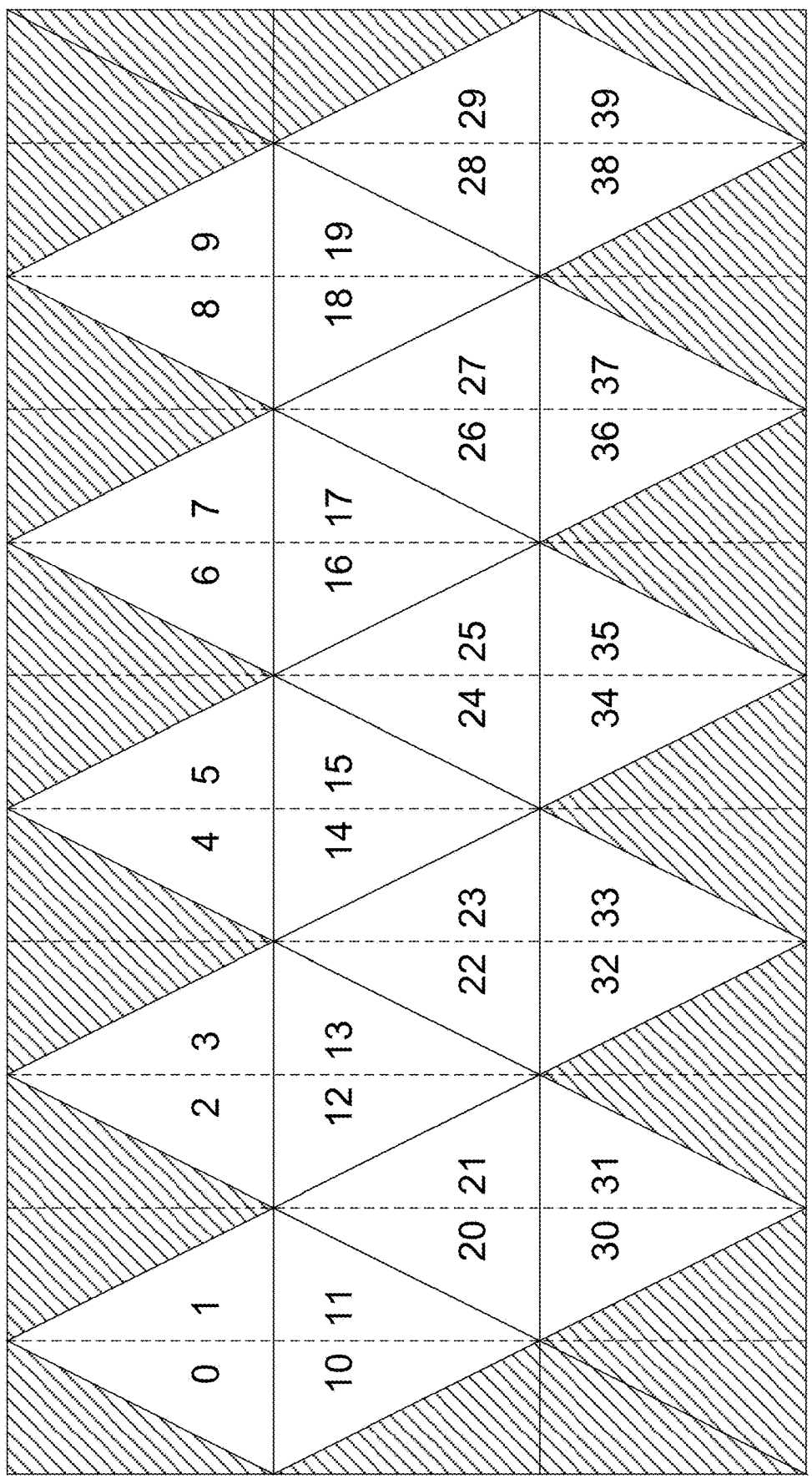
FIG. 12A illustrates a non-compact frame packing format for an icosahedron.

The grid system can also be used for geometry with non-square faces, such as triangular faces, as illustrated in FIGS. 11 and 12 for the octahedron and icosahedron, respectively. Because some triangular faces are split into two parts for compact representation (see FIG. 11B and FIG. 12B), one triangular face may be defined using two right-angled triangles instead of one isosceles or equilateral triangle. A basic right-angled triangle may be defined as depicted in FIG. 10A. As rotation is not sufficient to construct one isosceles or equilateral triangle using two right-angled triangles, rotation may be combined with a vertical flip (or, in some embodiments, a horizontal flip). With this representation, the same syntax may be used for both compact and non-compact representations with a lot of flexibility. For example, to signal the compact octahedron represented in FIG. 11B, the parameters may be set as follows row (but different heights across different rows), the face property can also be signaled using fewer parameters, as illustrated in Table 7.

TABLE 7

360-degree representation format alternative syntax

| | Descriptor |
|---|---|
| 360_format( ) { | |
|   projection_geometry | ue(v) |
|   geometry_rotation_param_present_flag | u(1) |
|   if( geometry_rotation_param_present_flag ) { | |
|     geometry_rotation_yaw | ue(v) |
|     geometry_rotation_pitch | ue(v) |
|     geometry_rotation_roll | ue(v) |
|   } | |
|   compact_representation_enabled_flag | u(1) |
|   loop_filter_across_faces_enabled_flag | u(1) |
|   num_face_rows_minus1 | ue(v) |
|   num_face_columns_minus1 | ue(v) |
|   face_qp_offset_enabled_flag | u(1) |
|   if( num_face_rows_minus1 > 0 ) | |
|     for( i = 0; i < num_face_rows_minus1; i++ ) { | |
|       row_height_in_luma_samples[i] | ue(v) |
|   if( num_face_columns_minus1 > 0 ) | |
|     for( j = 0; j < num_face_columns_minus1; j++ ) { | |
|       column_width_in_luma_samples[j] | ue(v) |
|   for( i = 0; i <= num_face_rows_minus1; i++ ) { | |
|     for( j = 0; j <= num_face_columns_minus1; j++ ) { | |
|       face_idx[i][j] | ue(v) |
|       face_rotation_idc[i][j] | ue(v) |
|       if ( face_rotation_idc[i][j] == 4 ) | |

```
projection_geometry = 3      // octahedron
num_face_rows = 1            // 1 row
num_face_columns = 16        //16 columns face_idx[0][0]  = 15  // face #15  face_rotation_idc[0][0]  = 2  face_vertical_flip_flag[0][0]  = 0  // 180
face_idx[0][1]  = 0   // face #0   face_rotation_idc[0][1]  = 0  face_vertical_flip_flag[0][1]  = 0  // 0
face_idx[0][2]  = 1   // face #1   face_rotation_idc[0][2]  = 2  face_vertical_flip_flag[0][2]  = 1  // 180 + vertical flip
face_idx[0][3]  = 8   // face #8   face_rotation_idc[0][3]  = 0  face_vertical_flip_flag[0][3]  = 1  // 0 + vertical flip
face_idx[0][4]  = 9   // face #9   face_rotation_idc[0][4]  = 2  face_vertical_flip_flag[0][4]  = 0  // 180
face_idx[0][5]  = 2   // face #2   face_rotation_idc[0][5]  = 0  face_vertical_flip_flag[0][5]  = 0  // 0
face_idx[0][6]  = 3   // face #3   face_rotation_idc[0][6]  = 2  face_vertical_flip_flag[0][6]  = 1  // 180 + vertical flip
face_idx[0][7]  = 10  // face #10  face_rotation_idc[0][7]  = 0  face_vertical_flip_flag[0][7]  = 1  // 0 + vertical flip
face_idx[0][8]  = 11  // face #11  face_rotation_idc[0][8]  = 2  face_vertical_flip_flag[0][8]  = 0  // 180
face_idx[0][9]  = 4   // face #4   face_rotation_idc[0][9]  = 0  face_vertical_flip_flag[0][9]  = 0  // 0
face_idx[0][10] = 5   // face #5   face_rotation_idc[0][10] = 2  face_vertical_flip_flag[0][10] = 1  // 180 + vertical flip
face_idx[0][11] = 12  // face #12  face_rotation_idc[0][11] = 0  face_vertical_flip_flag[0][11] = 1  // 0 + vertical flip
face_idx[0][12] = 13  // face #13  face_rotation_idc[0][12] = 2  face_vertical_flip_flag[0][12] = 0  // 180
face_idx[0][13] = 6   // face #6   face_rotation_idc[0][13] = 0  face_vertical_flip_flag[0][13] = 0  // 0
face_idx[0][14] = 7   // face #7   face_rotation_idc[0][14] = 2  face_vertical_flip_flag[0][14] = 1  // 180 + vertical flip
face_idx[0][15] = 14  // face #14  face_rotation_idc[0][15] = 0  face_vertical_flip_flag[0][15] = 1  // 0 + vertical flip
```

The face_qp_delta parameter can be used to specify if a particular face is encoded at higher or lower quality. Similar results can be obtained for example by adapting the quality at a slice or Coding Unit level. However, a slice could cover several faces and a face will most likely contain several Coding Units, so it may be more efficient to signal the quality difference for each face directly.

For regular frame packing grids composed of faces having the same width along each column (but different widths across different columns) and the same height along each TABLE 7-continued 360-degree representation format alternative syntax

| | Descriptor |
|---|---|
|       face_rotation[i][j] | ue(v) |
|       face_vertical_flip_flag[i][j] | u(1) |
|       if( face_qp_offset_enabled_flag ) | |
|         face_qp_offset[i][j] | se(v) |
|     } | |
|   } | |
| } | |

In an exemplary embodiment, the parameters of Table 7 may have the following semantics.

num_face_rows_minus1: specifies the number of face rows (minus 1) in the frame packed picture. When not present, the value of num_face_rows_minus1 can be inferred to be equal to 0.

num_face_columns_minus1: specifies the number of face columns (minus 1) in the frame packed picture. When not present, the value of num_face_columns_minus1 can be inferred to be equal to 0.

row_height_in_luma_samples[i]: specifies the height in luma samples of the faces located at the i-th row in the frame packed picture. For the last row, the height can be inferred to be equal to pic_height_in_luma_samples−$\Sigma_i$ row_height_in_luma_samples[i]. row_height_in_luma_samples [i] shall not be equal to 0 and shall be an integer multiple of MinCbSizeY.

column_width_in_luma_samples[j]: specifies the width in luma samples of the faces located at the j-th column in the frame packed picture. For the last column, the width can be inferred to be equal to pic_width_in_luma_samples−$\Sigma_j$ column_widthin_luma_samples[j]. column_width_in_luma_samples[j] shall not be equal to 0 and shall be an integer multiple of MinCbSizeY.

The face property can also be signaled in a face index order for an irregular face shape. Table 8 shows an example.

TABLE 8

360-degree representation format alternative syntax

| | Descriptor |
|---|---|
| 360_format( ) { | |
|   projection_geometry | ue(v) |
|   geometry_rotation_param_present_flag | u(1) |
|   if( geometry_rotation_param_present_flag ) { | |
|     geometry_rotation_yaw | ue(v) |
|     geometry_rotation_pitch | ue(v) |
|     geometry_rotation_roll | ue(v) |
|   } | |
|   compact_representation_enabled_flag | u(1) |
|   face_boundary_filtering_idc | ue(v) |
|   face_qp_delta_enabled_flag | u(1) |
|   num_faces | ue(v) |
|   for( i = 0; i < num_faces; i++ ) { | |
|     face_idx[i] | ue(v) |
|     num_face_vertices[i] | ue(v) |
|     for( j=0; j < num_face_vertices[i]; j++ ) { | |
|       vertex_2D_pos_x[i][j] | ue(v) |
|       vertex_2D_pos_y[i][j] | ue(v) |
|       if( projection_geometry == 6 ) { | |
|         vertex_3D_pos_x[i][j] | se(v) |
|         vertex_3D_pos_y[i][j] | se(v) |
|         vertex_3D_pos_z[i][j] | se(v) |
|       } | |
|     } | |
|     face_rotation_idc[i][j] | ue(v) |
|     if( face_rotation_idc[i][j] == 4 ) | |
|       face_rotation[i][j] | ue(v) |
|     face_vertical_flip_flag[i][j] | u(1) |
|     if( face_qp_offset_enabled_flag ) | |
|       face_qp_delta[i][j] | se(v) |
|   } | |
| } | |

In an exemplary embodiment, the parameters of Table 8 may have the following semantics.

num_faces: specifies the number of faces in the frame packed picture. When not present, the value of num_faces can be inferred to be equal to 1.

Note that, instead of signaling num_faces, num_faces_minus1 may be signaled to reduce the number of bits needed to code this syntax element.

num_face_vertices[i]: specifies the i-th face's vertices number. When not present, the value of num_face_vertices [i] can be inferred to be equal to 4 as quadrilateral is the most common face polygon type.

vertex_2D_pos_x[i][j]: specifies the x coordinate in the frame-packed picture of the j-th vertex of the i-th face.

vertex_2D_pos_y[i][j]: specifies the y coordinate in the frame-packed picture of the j-th vertex of the i-th face.

vertex_3D_pos_x[i][j]: specifies the x coordinate in the 3D coordinate system of the j-th vertex of the i-th face.

vertex_3D_pos_y[i][j]: specifies the y coordinate in the 3D coordinate system of the j-th vertex of the i-th face.

vertex_3D_pos_z[i][j]: specifies the z coordinate in the 3D coordinate system of the j-th vertex of the i-th face.

The vertex_3D_pos_x[i][j], vertex_3D_pos_y[i][j], and vertex_3D_pos_z[i][j] parameters can be used to define user specified polygon-based geometries in the 3D space. These parameters may be used to map a sample from its location in the frame-packed picture to the corresponding location in the 3D geometry. This information may be exploited by advanced 360-video coding to achieve better compression efficiency. For example, the codec may exploit redundant information between neighboring faces in the 3D representation that are not collocated in the frame-packed picture.

360-Degree Video Property Signaling at Sequence Level.

At the sequence level, the projection formats that are used may be signaled. For this purpose, a new parameter set can be introduced for 360-video as depicted in Table 9.

Table 9

General sequence parameter set RBSP syntax

| | Descriptor |
|---|---|
| seq_parameter_set_rbsp( ) { | |
|   ... | |
|   sps_360_extension_flag | u(1) |
|   if(sps_360_extension_flag) | |
|     sps_360_extension( ) | |
|   ... | |
| } | |

In an exemplary embodiment, the parameters of Table 9 may have the following semantics.

sps_360_extension_flag: specifies whether the sequence is a 360-video, in which case specific parameters and tools for efficient compression of 360-video may be used.

The used projection formats can be signaled according to Table 10.

Table 10

Sequence parameter set 360 extension syntax

| | Descriptor |
|---|---|
| sps_360_extension( ) { | |
|   sps_num_360_formats_minus1 | ue(v) |
|   for(i = 0; i <= sps_num_360_formats_minus1; i++) | |
|     sps_360_format_idx[i] | ue(v) |
| } | |

In an exemplary embodiment, the parameters of Table 10 may have the following semantics.

sps_num_360_formats_minus1: specifies the number (minus 1) of projection formats used in the sequence. When not present, the value of sps_num_360_formats_minus1 can be inferred to be equal to 0, indicating that only one projection format is used.

sps_360_format_idx[i]: specifies the list of indexes into the list of 360_format( ) syntax structures in the VPS of the 360_format( ) syntax structures that are used in the sequence. The value of sps_360_format_idx[i] may be in the range of 0 to vps_num_360_formats_minus1, inclusive.

Note that all 360 video related parameters defined at VPS level may be changed at SPS level. Though not shown in Table 10, instead of using sps_360_format_idx to index into the set of 360 video formats sent in the VPS, similar syntax elements as those defined in Table 3 (e.g., projection_geometry, face dimension parameters, face QP offset, etc.) may be directly signaled as part of the SPS extension to indicate the 360 video parameters of the video sequence that refers to this SPS.

360-Degree Video Property Signaling at Picture Level.

In some embodiments, to provide greater coding optimization, a sequence may be encoded using different projection formats for the different frames. In this case, the projection format can be signaled at picture level via an index into the set of projection formats already signaled at the VPS or SPS level. For this purpose, in some embodiments, a new parameter set may be introduced for 360-video as depicted in Table 11.

TABLE 11

General picture parameter set RBSP syntax

|  | Descriptor |
|---|---|
| pic_parameter_set_rbsp( ) { | |
| ... | |
| pps_360_extension_flag | u(1) |
| if( pps_360_extension_flag ) | |
| pps_360_extension( ) | |
| ... | |
| } | |

In an exemplary embodiment, the parameters of Table 11 may have the following semantics.

pps_360_extension_flag: specifies whether the picture that refers to this PPS contains specific parameters related to 360-degree video coding. When not present, the value of pps_360_extension_flag can be inferred to be equal to sps_360_extension_flag.

An example of the PPS extension for 360 video is provided in Tables 12 and 13.

TABLE 12

Picture parameter set 360 extension syntax

|  | Descriptor |
|---|---|
| pps_360_extension( ) { | |
| pps_360_format_idx | ue(v) |
| coding_region_table( ) | |
| } | |

TABLE 13

Coding region table syntax

|  | Descriptor |
|---|---|
| coding_region_table( ) { | |
| full_sphere_range_coding_flag | u(1) |
| if( !full_sphere_range_coding_flag ) { | |

TABLE 13-continued

Coding region table syntax

|  | Descriptor |
|---|---|
| pos_x_in_360_packed_frame | ue(v) |
| pos_y_in_360_packed_frame | ue(v) |
| } | |
| } | |

In an exemplary embodiment, the parameters of Tables 12 and 13 may have the following semantics.

pps_360_format_idx: specifies the index into the set of projection_geometry defined at the SPS referred to by this PPS. The value of pps_360_format_idx shall be in the range of 0 to sps_num_360_formats_minus1, inclusive. When not present, the value of pps_360_format_idx can be inferred to be equal to 0.

The pps_360_format_idx parameter is used to specify the projection format for the current picture among the available projection formats listed at the sequence level. For example, if only equirectangular and equal-area are available in the list of sps_360_format_idx in the SPS, and we use the index "0" to represent equal-area and "1" to represent equirectangular, then the parameter can be set as follows
pps_360_format_idx=0//all pictures that refer to this PPS will be coded in equal-area format
pps_360_format_idx=1//all pictures that refer to this PPS are coded in equirectangular format Within the same video sequence, if different pictures are allowed to have different projection geometry formats, then temporal motion compensated prediction using the translational motion model with 2 motion parameters (horizontal and vertical displacement parameters, respectively) or using the affine based motion model with 4 or 6 motion parameters may no longer work very efficiently. Instead, if the projection geometry of the current picture is different from that of its temporal reference picture, then geometry conversion may be performed to align the projection geometry between the current picture and its temporal reference, before existing temporal motion compensated prediction is applied. This may increase temporal prediction efficiency, though at the cost of higher computing complexity. When more than one temporal reference picture is used in motion compensated prediction (e.g., bi-prediction), then the projection geometry may be aligned between the current picture and all of its reference pictures, before motion compensated prediction may be performed.

In an exemplary embodiment, the semantics of the coding_region_table( ) syntax structure may be as follows:

full_sphere_range_coding_flag: specifies whether the full sphere range is coded or if only a portion of it is coded. When not present, the value of full_sphere_range_coding_flag can be inferred to be equal to 1.

pos_x_in_360_packed_frame: specifies the x coordinate of the coded picture upper left corner in the frame packed picture.

pos_y_in_360_packed_frame: specifies the y coordinate of the coded picture upper left corner in the frame packed picture.

Because of different limitations, such as bandwidth or memory limitations or decoding capabilities, only a portion of the full sphere may be coded. This information can be signaled using the full_sphere_range_coding_flag and associated pos_x_in_360_packed_frame and pos_y_in_360_packed_frame parameters. When full_sphere_range_coding_flag is set to 0, only a rectangular portion of the full frame-packed picture is coded. The upper left corner of the coded picture inside the frame-packed picture is then signaled using the associated pos_x_in_360_packed_frame and pos_y_in_360_packed_frame parameters.

Figure 13A:
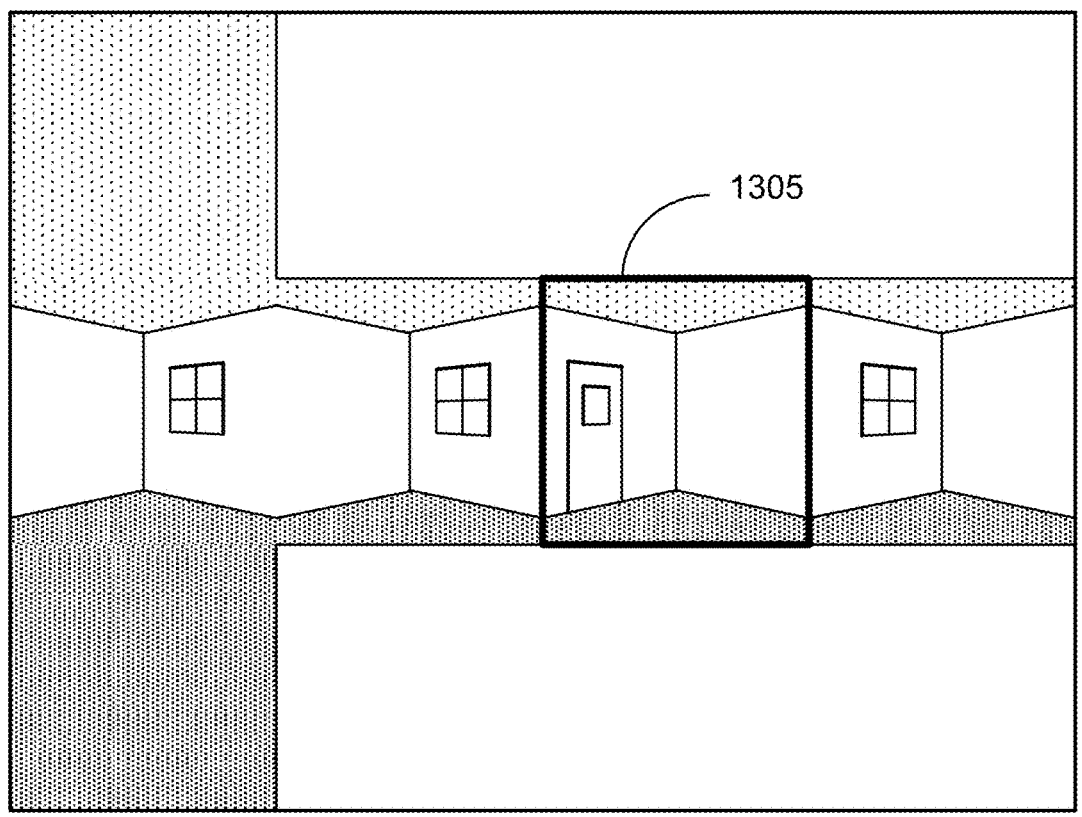
FIG. 13A illustrates limited sphere range coding for cubemap, where the full picture represents the frame-packed picture and the rectangle delimits the coded area.
Figure 13B:
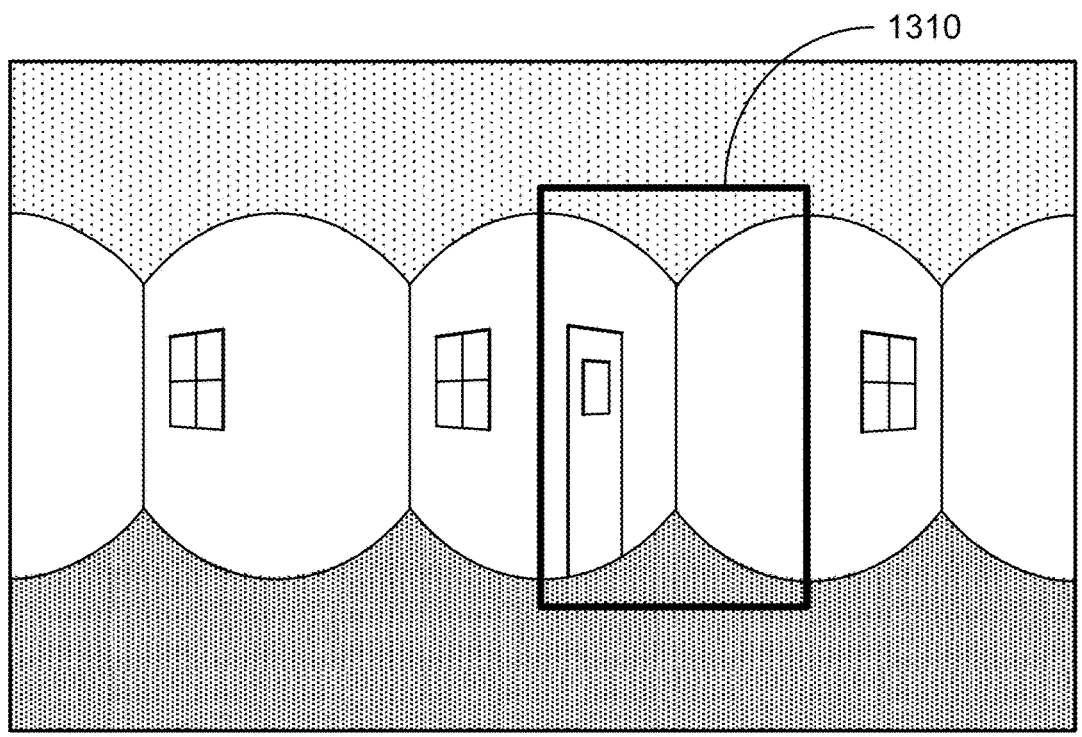
FIG. 13B illustrates limited sphere range coding for equilateral, where the full picture represents the frame-packed picture and the rectangle delimits the coded area.

FIGS. 13A-B illustrate the use of the limited sphere range coding for the cubemap (FIG. 13A) and equirectangular (FIG. 13B) projections. In these examples, only the front area is coded. Note that when using limited sphere range coding, the constraints linking the faces width/height and coded picture width/height should be disabled. As shown in FIG. 13A, the full picture represents the frame-packed picture and rectangle 1305 delimits the coded area. As shown in FIG. 13B, the full picture represents the frame-packed picture and rectangle 1310 delimits the coded area.

The coding_region_table( ) may also be signaled at VPS and/or PPS levels for each projection format.

Note that some of the parameters defined at the SPS and/or VPS level may be alternatively or additionally signaled at the PPS level. For example, it may be particularly advantageous to signal the face QP offset parameters at the PPS level, instead of at the VPS or SPS level, as it allows more flexibility to adjust the face quality of each individual face at the picture level. For example, it allows flexibility to adjust the face quality of each individual face depending on the temporal level of the current frame-packed picture in the hierarchical B prediction structure. For example, at higher temporal level, the face QP offset may be set to a larger value for non-front faces, whereas the face QP offset may be set to a smaller value (e.g., 0) for the front face. This may ensure that the front face is always coded at relatively high constant quality regardless of temporal level of the current picture, whereas the other faces of a higher temporal level picture may be quantized more to save bits.

Similarly, the geometry rotation parameter, e.g., geometry_rotation_yaw, geometry_rotation_pitch, and geometry_rotation_roll, may be defined and signaled at the PPS level, instead of at the VPS or SPS level, as it allows more flexibility to adjust the geometry rotation at picture level. In some embodiments, a recommended viewing direction is selected for the content being encoded (e.g. selected by a director of the video content), where the recommended viewing direction may change over the course of a video. In such embodiments, the geometry rotation parameter may be set in accordance with the recommended viewing direction and coupled with the face QP offset parameters such that the object or region of interest is projected to the face coded with the highest quality.

Figure 14A:
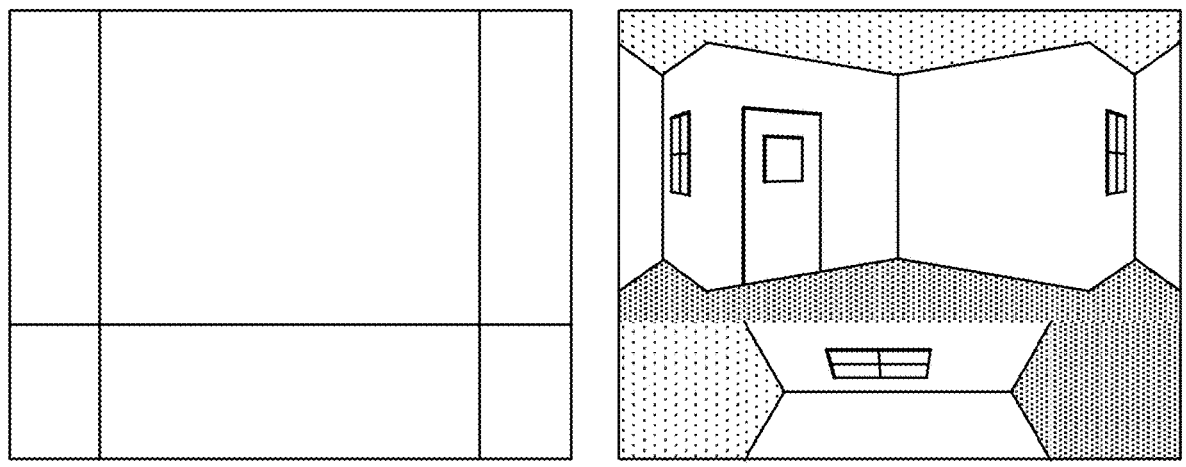
FIGS. 14A and 14B illustrate exemplary alternative arrangements of faces in a frame-packed picture, each illustrating arrangements of six faces, such as may be used in conjunction with a cubemap projection.
Figure 14B:
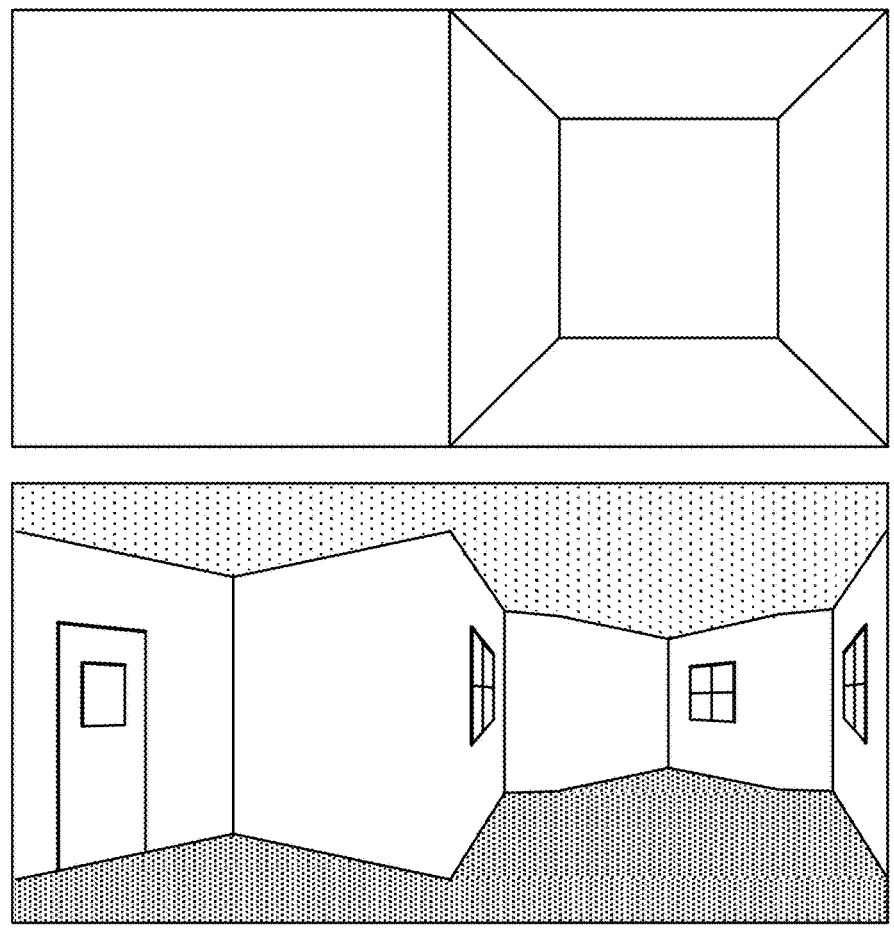

FIGS. 14A and 14B illustrate exemplary alternative arrangements of faces in a frame-packed picture. FIGS. 14A and 14B each illustrate arrangements of six faces, such as may be used in conjunction with a cubemap projection. The arrangements of faces in FIGS. 14A and 14B may be employed as user-specified geometries using embodiments disclosed herein.

Exemplary embodiments disclosed herein are implemented using one or more wired and/or wireless network nodes, such as a wireless transmit/receive unit (WTRU) or other network entity.

Figure 15:
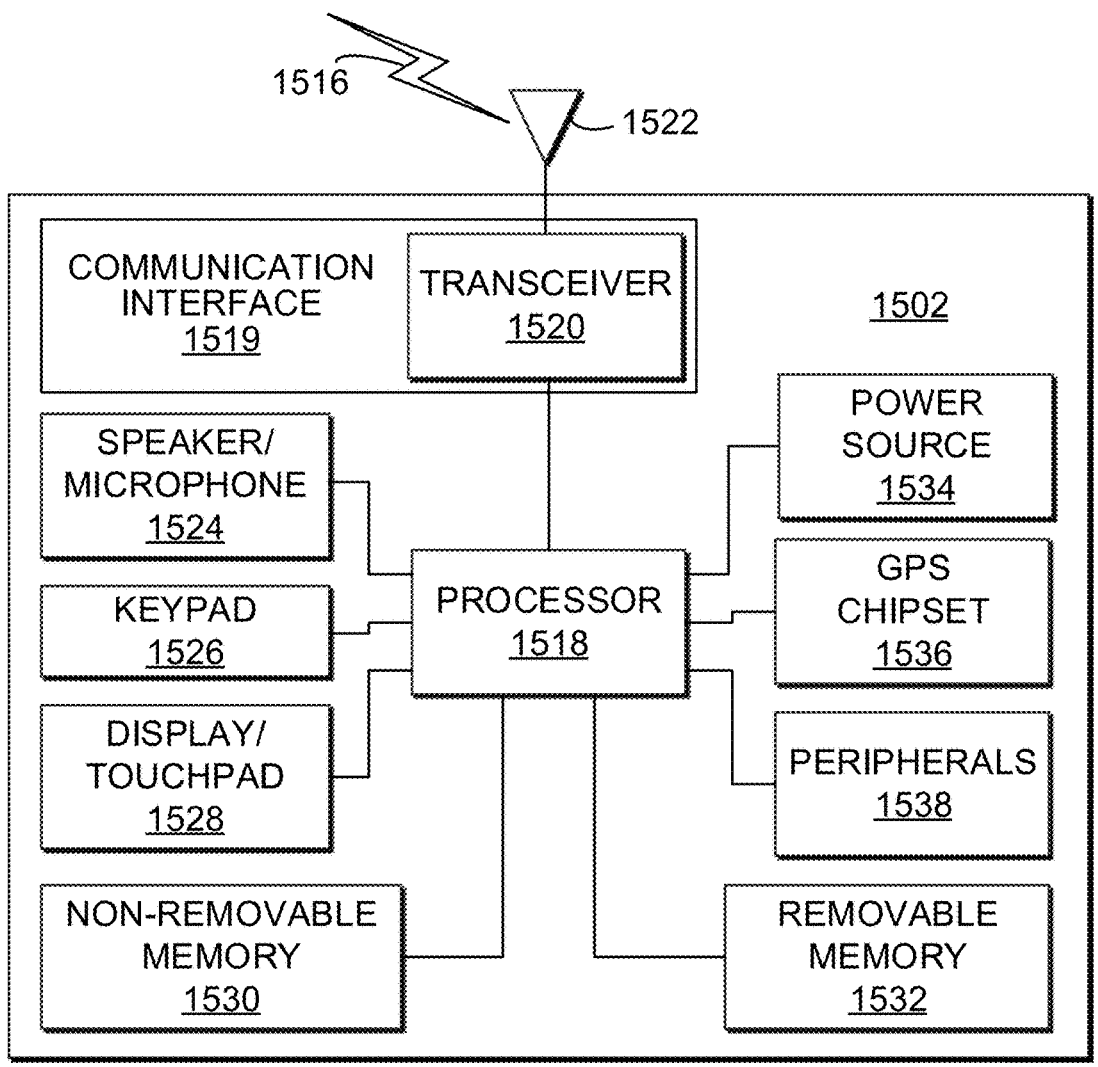
FIG. 15 illustrates an exemplary wireless transmit/receive unit (WTRU) that may be employed as an encoder or decoder in some embodiments.

FIG. 15 is a system diagram of an exemplary WTRU 1502, which may be employed as an encoder or decoder in embodiments described herein. As shown in FIG. 15, the WTRU 1502 may include a processor 1518, a communication interface 1519 including a transceiver 1520, a transmit/receive element 1522, a speaker/microphone 1524, a keypad 1526, a display/touchpad 1528, a non-removable memory 1530, a removable memory 1532, a power source 1534, a global positioning system (GPS) chipset 1536, and sensors 1538. It will be appreciated that the WTRU 1502 may include any sub-combination of the foregoing elements while remaining consistent with an embodiment.

The processor 1518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1518 may perform signal coding, data processing, power control, input/output processing, and/or any other functionality that enables the WTRU 1502 to operate in a wireless environment. The processor 1518 may be coupled to the transceiver 1520, which may be coupled to the transmit/receive element 1522. While FIG. 15 depicts the processor 1518 and the transceiver 1520 as separate components, it will be appreciated that the processor 1518 and the transceiver 1520 may be integrated together in an electronic package or chip.

The transmit/receive element 1522 may be configured to transmit signals to, or receive signals from, a base station over the air interface 1516. For example, in one embodiment, the transmit/receive element 1522 may be an antenna configured to transmit and/or receive RF signals. In another embodiment, the transmit/receive element 1522 may be an emitter/detector configured to transmit and/or receive IR, UV, or visible light signals, as examples. In yet another embodiment, the transmit/receive element 1522 may be configured to transmit and receive both RF and light signals. It will be appreciated that the transmit/receive element 1522 may be configured to transmit and/or receive any combination of wireless signals.

In addition, although the transmit/receive element 1522 is depicted in FIG. 15 as a single element, the WTRU 1502 may include any number of transmit/receive elements 1522. More specifically, the WTRU 1502 may employ MIMO technology. Thus, in one embodiment, the WTRU 1502 may include two or more transmit/receive elements 1522 (e.g., multiple antennas) for transmitting and receiving wireless signals over the air interface 1516.

The transceiver 1520 may be configured to modulate the signals that are to be transmitted by the transmit/receive element 1522 and to demodulate the signals that are received by the transmit/receive element 1522. As noted above, the WTRU 1502 may have multi-mode capabilities. Thus, the transceiver 1520 may include multiple transceivers for enabling the WTRU 1502 to communicate via multiple RATs, such as UTRA and IEEE 802.11, as examples.

The processor 1518 of the WTRU 1502 may be coupled to, and may receive user input data from, the speaker/microphone 1524, the keypad 1526, and/or the display/touchpad 1528 (e.g., a liquid crystal display (LCD) display unit or organic light-emitting diode (OLED) display unit). The processor 1518 may also output user data to the speaker/microphone 1524, the keypad 1526, and/or the display/touchpad 1528. In addition, the processor 1518 may access information from, and store data in, any type of suitable memory, such as the non-removable memory 1530 and/or the removable memory 1532. The non-removable memory 1530 may include random-access memory (RAM), read-only memory (ROM), a hard disk, or any other type of memory storage device. The removable memory 1532 may include a subscriber identity module (SIM) card, a memory stick, a secure digital (SD) memory card, and the like. In other embodiments, the processor 1518 may access information from, and store data in, memory that is not physically located on the WTRU 1502, such as on a server or a home computer (not shown).

The processor 1518 may receive power from the power source 1534, and may be configured to distribute and/or control the power to the other components in the WTRU 1502. The power source 1534 may be any suitable device for powering the WTRU 1502. As examples, the power source 1534 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1518 may also be coupled to the GPS chipset 1536, which may be configured to provide location information (e.g., longitude and latitude) regarding the current location of the WTRU 1502. In addition to, or in lieu of, the information from the GPS chipset 1536, the WTRU 1502 may receive location information over the air interface 1516 from a base station and/or determine its location based on the timing of the signals being received from two or more nearby base stations. It will be appreciated that the WTRU 1502 may acquire location information by way of any suitable location-determination method while remaining consistent with an embodiment.

The processor 1518 may further be coupled to other peripherals 1538, which may include one or more software and/or hardware modules that provide additional features, functionality and/or wired or wireless connectivity. For example, the peripherals 1538 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 16:
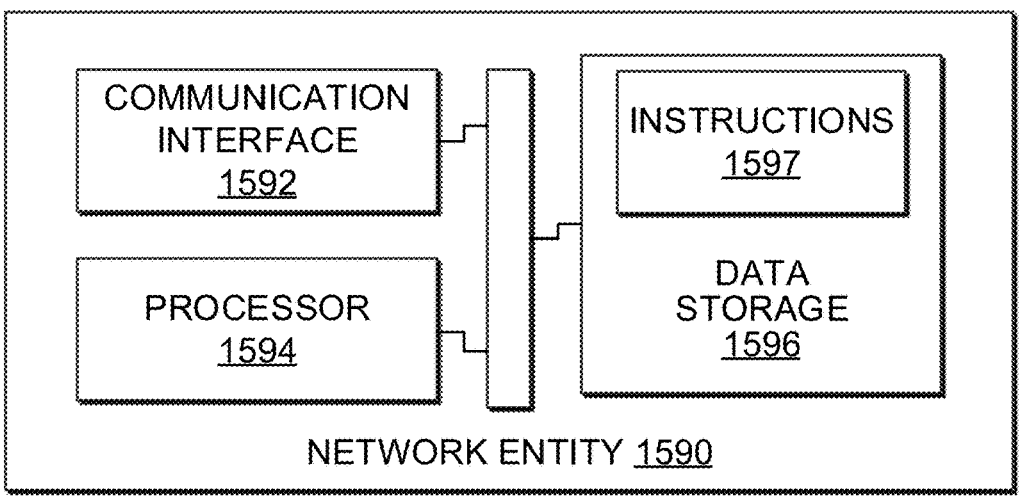
FIG. 16 illustrates an exemplary network entity that may be employed as an encoder or decoder in some embodiments.

FIG. 16 depicts an exemplary network entity 1590 that may be used in embodiments of the present disclosure, for example as an encoder or decoder. As depicted in FIG. 16, network entity 1590 includes a communication interface 1592, a processor 1594, and non-transitory data storage 1596, all of which are communicatively linked by a bus, network, or other communication path 1598.

Communication interface 1592 may include one or more wired communication interfaces and/or one or more wireless-communication interfaces. With respect to wired communication, communication interface 1592 may include one or more interfaces such as Ethernet interfaces, as an example. With respect to wireless communication, communication interface 1592 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1592 may be equipped at a scale and with a configuration appropriate for acting on the network side—as opposed to the client side—of wireless communications (e.g., LTE communications, Wi-Fi communications, and the like). Thus, communication interface 1592 may include the appropriate equipment and circuitry (perhaps including multiple transceivers) for serving multiple mobile stations, UEs, or other access terminals in a coverage area.

Processor 1594 may include one or more processors of any type deemed suitable by those of skill in the relevant art, some examples including a general-purpose microprocessor and a dedicated DSP.

Data storage 1596 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 16, data storage 1596 contains program instructions 1597 executable by processor 1594 for carrying out various combinations of the various network-entity functions described herein.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A video encoding method comprising:
    signaling, in a bitstream representing a video comprising at least one picture, a location of a signaled boundary within the picture, wherein signaling the location of the signaled boundary comprises signaling at least one of an x-position or a y-position of the signaled boundary; and
    signaling, in the bitstream, an indication of whether in-loop filtering is disabled across the signaled boundary.

2. The method of claim 1, further comprising applying a loop filter to at least a portion of the picture to generate a filtered picture, wherein:
    the loop filter is not applied across the signaled boundary; and
    the indication of whether in-loop filtering is disabled across the signaled boundary is an indication that in-loop filtering is disabled across the signaled boundary.

3. The method of claim 2, further comprising storing the filtered picture in a reference picture store.

4. The method of claim 1, wherein the location of the signaled boundary and the indication of whether in-loop filtering is disabled across the signaled boundary are signaled in a sequence parameter set.

5. The method of claim 1, wherein signaling the location of the signaled boundary comprises signaling at least one x-position of the signaled boundary.

6. The method of claim 1, wherein signaling the location of the signaled boundary comprises signaling at least one y-position of the signaled boundary.

7. The method of claim 1, wherein the indication of whether in-loop filtering is disabled across the signaled boundary comprises an indication of whether a de-blocking filter is disabled across the signaled boundary.

8. The method of claim 1, wherein the indication of whether in-loop filtering is disabled across the signaled boundary comprises an indication of whether an adaptive loop filter is disabled across the signaled boundary.

9. A video decoding method comprising:
  decoding, from a bitstream representing a video comprising at least one picture, a location of a signaled boundary within the picture, wherein decoding the location of the signaled boundary comprises decoding at least one of an x-position or a y-position of the signaled boundary; and
  decoding, from the bitstream, an indication of whether in-loop filtering is disabled across the signaled boundary.

10. The method of claim 9, further comprising applying a loop filter to at least a portion of the picture to generate a filtered picture, wherein:
  the loop filter is not applied across the signaled boundary; and
  the indication of whether in-loop filtering is disabled across the signaled boundary is an indication that in-loop filtering is disabled across the signaled boundary.

11. The method of claim 10, further comprising storing the filtered picture in a reference picture store.

12. The method of claim 9, wherein the location of the signaled boundary and the indication of whether in-loop filtering is disabled across the signaled boundary are signaled in a sequence parameter set.

13. The method of claim 9, wherein decoding the location of the signaled boundary comprises decoding at least one x-position of the signaled boundary.

14. The method of claim 9, wherein decoding the location of the signaled boundary comprises decoding at least one y-position of the signaled boundary.

15. The method of claim 9, wherein the indication of whether in-loop filtering is disabled across the signaled boundary comprises an indication of whether a de-blocking filter is disabled across the signaled boundary.

16. The method of claim 9, wherein the indication of whether in-loop filtering is disabled across the signaled boundary comprises an indication of whether an adaptive loop filter is disabled across the signaled boundary.

17. An apparatus comprising one or more processors configured to perform:
  decoding, from a bitstream representing a video comprising at least one picture, a location of a signaled boundary within the picture, wherein decoding the location of the signaled boundary comprises decoding at least one of an x-position or a y-position of the signaled boundary; and
  decoding, from the bitstream, an indication of whether in-loop filtering is disabled across the signaled boundary.

18. The apparatus of claim 17, further configured to apply a loop filter to at least a portion of the picture to generate a filtered picture, wherein:
  the loop filter is not applied across the signaled boundary; and
  the indication of whether in-loop filtering is disabled across the signaled boundary is an indication that in-loop filtering is disabled across the signaled boundary.

19. The apparatus of claim 18, further configured to store the filtered picture in a reference picture store.

20. The apparatus of claim 17, wherein the location of the signaled boundary and the indication of whether in-loop filtering is disabled across the signaled boundary are signaled in a sequence parameter set.

* * * * *